United States Patent
Li et al.

(10) Patent No.: US 12,320,958 B2
(45) Date of Patent: Jun. 3, 2025

(54) CAMERA LENS GROUP

(71) Applicant: Zhejiang Sunny Optics Co., Ltd, Yuyao (CN)

(72) Inventors: Yang Li, Yuyao (CN); Lingbo He, Yuyao (CN); Fujian Dai, Yuyao (CN); Liefeng Zhao, Yuyao (CN)

(73) Assignee: Zhejiang Sunny Optics Co., Ltd (CN)

( * ) Notice: Subject to any disclaimer, the term of this patent is extended or adjusted under 35 U.S.C. 154(b) by 552 days.

(21) Appl. No.: 17/580,604

(22) Filed: Jan. 20, 2022

(65) Prior Publication Data

US 2022/0260810 A1    Aug. 18, 2022

(30) Foreign Application Priority Data

Feb. 7, 2021 (CN) .......................... 202110175893.3

(51) Int. Cl.
*G02B 9/62* (2006.01)
*G02B 13/00* (2006.01)

(52) U.S. Cl.
CPC .......... *G02B 13/0045* (2013.01); *G02B 9/62* (2013.01)

(58) Field of Classification Search
CPC ......... G02B 13/0045; G02B 9/64; G02B 9/62
See application file for complete search history.

(56) References Cited

U.S. PATENT DOCUMENTS

| | | | | |
|---|---|---|---|---|
| 9,046,672 B2* | 6/2015 | You | ..................... | G02B 13/0045 |
| 9,274,315 B2* | 3/2016 | Lee | ..................... | G02B 27/646 |
| 10,061,104 B2* | 8/2018 | Dai | ..................... | G02B 1/041 |
| 10,254,510 B2* | 4/2019 | Dai | ..................... | G02B 9/62 |
| 10,859,796 B2* | 12/2020 | Li | ..................... | G02B 7/04 |
| 10,948,695 B2 | 3/2021 | Yeh et al. | | |
| 11,016,271 B2* | 5/2021 | Jung | ..................... | G02B 3/02 |
| 11,181,719 B2* | 11/2021 | Kim | ..................... | G02B 9/64 |

(Continued)

FOREIGN PATENT DOCUMENTS

| | | |
|---|---|---|
| CN | 104238090 A | 12/2014 |
| CN | 105372794 A | 3/2016 |

(Continued)

OTHER PUBLICATIONS

First Examination Report for Indian Patent Application No. 202214003418; Jul. 21, 2022.

(Continued)

*Primary Examiner* — Christopher Stanford
(74) *Attorney, Agent, or Firm* — Barnes & Thornburg

(57) ABSTRACT

Embodiments of the present disclosure disclose a camera lens group, comprising, sequentially along an optical axis from an object side to an image side: a stop; a first lens having a positive refractive power; a second lens having a refractive power; a third lens having a negative refractive power; a fourth lens having a positive refractive power; a fifth lens having a positive refractive power; and a sixth lens having a negative refractive power. A distance TTL on the optical axis from the object-side surface of the first lens to an image plane of the camera lens group and half of a diagonal length ImgH of an effective pixel area on the image plane of the camera lens group satisfy: TTL/ImgH≤1.25. At least one of the surfaces from the object-side surface of the first lens to the image-side surface of the sixth lens is an aspheric surface.

20 Claims, 8 Drawing Sheets

(56) References Cited

U.S. PATENT DOCUMENTS

| | | | |
|---|---|---|---|
| 11,249,280 B2 * | 2/2022 | Yoo | ............ G02B 9/64 |
| 11,366,288 B2 * | 6/2022 | Son | ......... H04N 23/55 |
| 11,644,643 B2 * | 5/2023 | Jung | ......... G02B 13/0045 |
| | | | 359/755 |
| 2010/0321796 A1 | 12/2010 | Tang | |
| 2020/0225452 A1 | 7/2020 | Wenren et al. | |

FOREIGN PATENT DOCUMENTS

| | | | | |
|---|---|---|---|---|
| CN | 107817572 A | | 3/2018 | |
| CN | 108535844 A | | 9/2018 | |
| CN | 108663780 A | * | 10/2018 | ......... G02B 13/0045 |
| CN | 109031629 A | | 12/2018 | |
| CN | 109683286 A | | 4/2019 | |
| CN | 110376717 A | | 10/2019 | |
| CN | 110515175 A | | 11/2019 | |
| CN | 210720855 U | | 6/2020 | |
| CN | 111413787 A | | 7/2020 | |
| CN | 211653280 U | * | 10/2020 | ......... G02B 13/0045 |
| CN | 212009122 U | | 11/2020 | |
| CN | 113933961 A | * | 1/2022 | |
| CN | 114647064 B | * | 8/2024 | ......... G02B 13/0045 |
| KR | 20140031786 A | | 3/2014 | |
| KR | 101690481 B1 | | 12/2016 | |
| TW | I699553 B | | 7/2020 | |
| WO | 2015152462 A1 | | 10/2015 | |
| WO | 2020073983 A1 | | 4/2020 | |

OTHER PUBLICATIONS

First Office Action for Application No. CN112904535, dated Feb. 17, 2022, 11 pages.

* cited by examiner

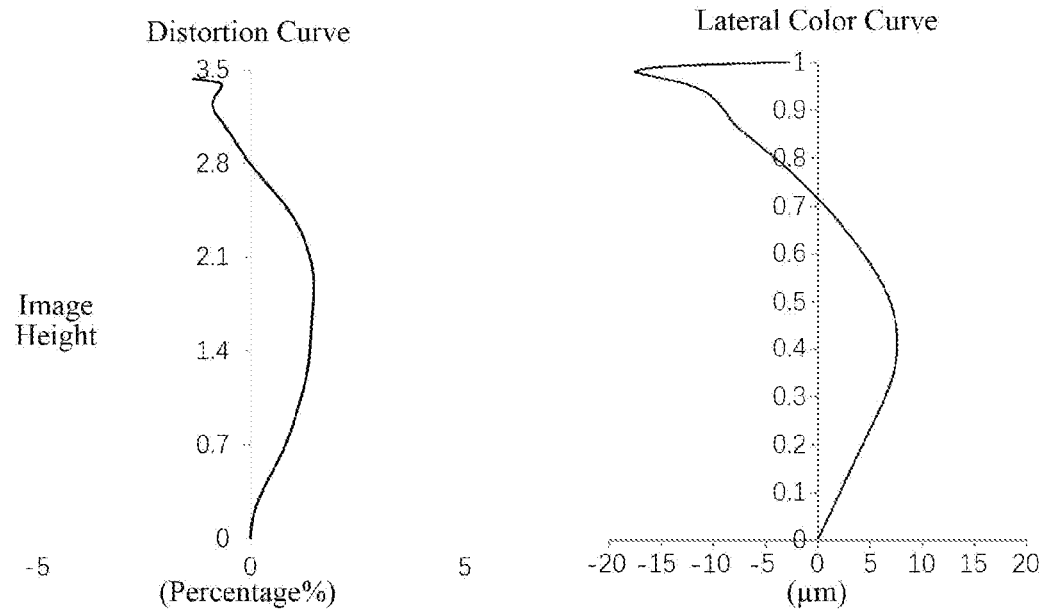
Fig. 6C
Fig. 6D
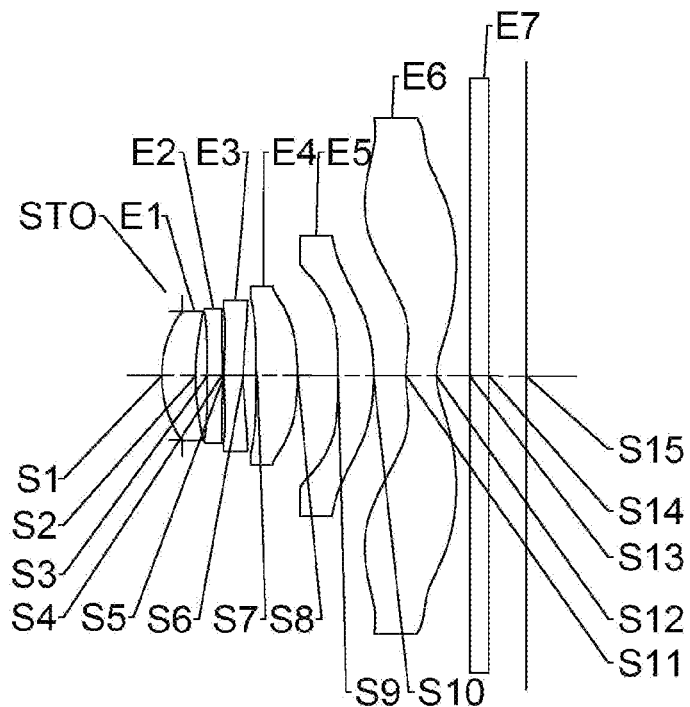
Fig. 7

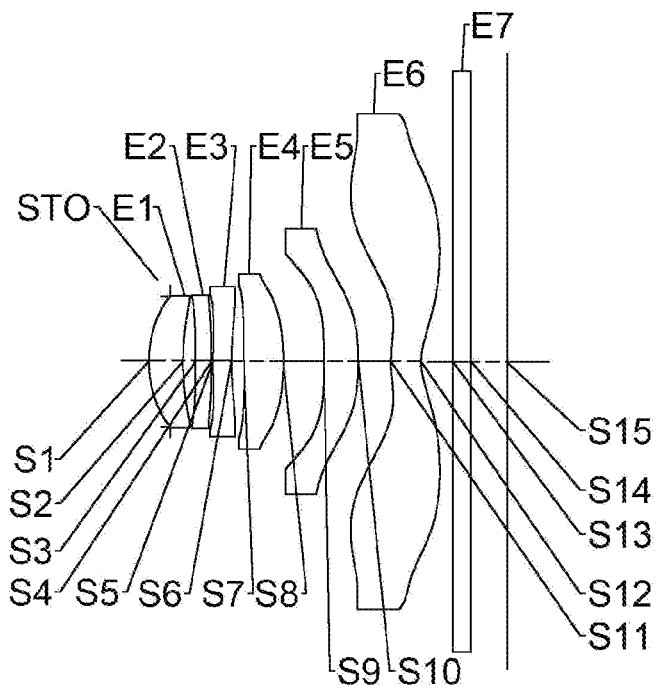
Fig. 9
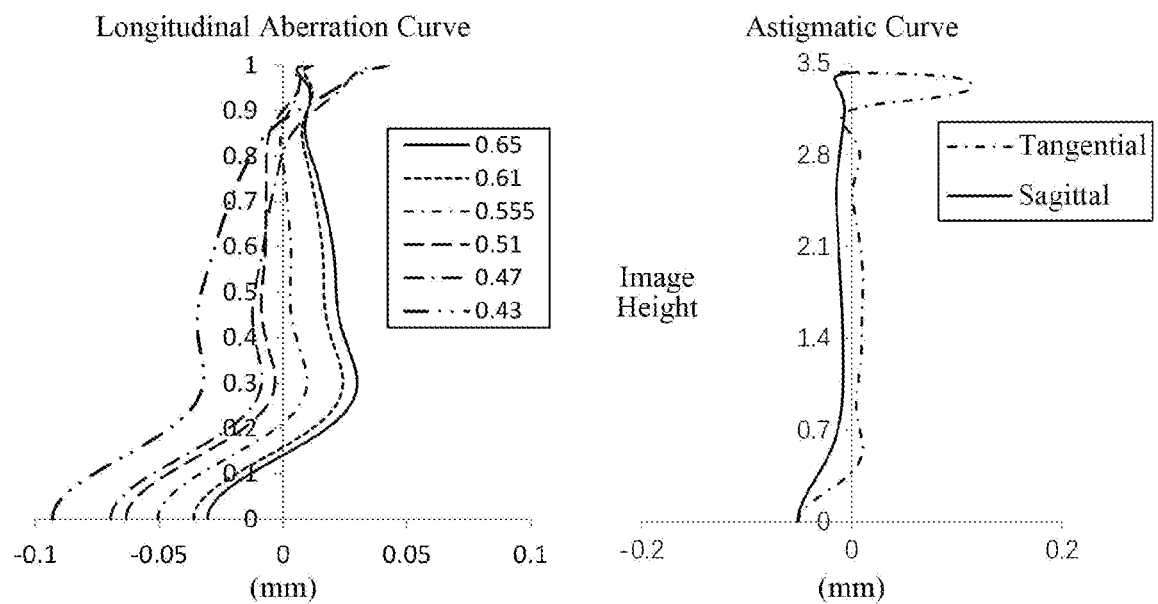
Fig. 10AFig. 10B

CAMERA LENS GROUP

CROSS-REFERENCE TO RELATED APPLICATIONS

This application claims the priority from Chinese Patent Application No. 202110175893.3, filed in the National Intellectual Property Administration (CNIPA) on Feb. 7, 2021, the contents of which are hereby incorporated by reference in their entirety.

TECHNICAL FIELD

The present disclosure relates to the field of optical elements, and particularly to a camera lens group.

BACKGROUND

In recent years, with the rapid development of portable electronic products such as smart phones, the imaging quality of portable electronic products such as smart phones has gradually become one of the important indicators to evaluate the performance of smart phones or the like, and consumers have higher and higher requirements for the shooting function of smart phones. While pursuing the imaging quality of the camera lens group mounted on the smartphone, consumers also urgently hope that the smart phones equipped with the camera lens group has high aesthetics.

In order to improve the aesthetics of smart phones, major mobile phone manufacturers began to study how to make mobile phones have a larger screen-to-body ratio. Therefore, in order to adapt to the development of smart phones, designing a camera lens group with high imaging quality mounted on mobile phones with large screen-to-body ratio has obviously become the development trend in the field of lens assembly.

SUMMARY

An aspect of the present disclosure provides a camera lens group, which comprises, sequentially along an optical axis from an object side to an image side: a stop; a first lens having a positive refractive power, an object-side surface of the first lens is a convex surface, and an image-side surface of the first lens is a concave surface; a second lens having a refractive power, and an image-side surface of the second lens is a convex surface; a third lens having a negative refractive power, an object-side surface of the third lens is a convex surface, and an image-side surface of the third lens is a concave surface; a fourth lens having a positive refractive power, and an image-side surface of the fourth lens is a convex surface; a fifth lens having a positive refractive power, an object-side surface of the fifth lens is a concave surface, and an image-side surface of the fifth lens is a convex surface; and a sixth lens having a negative refractive power, an object-side surface of the sixth lens is a convex surface, and an image-side surface of the sixth lens is a concave surface. A distance TTL on the optical axis from the object-side surface of the first lens to an image plane of the camera lens group and half of a diagonal length ImgH of an effective pixel area on the image plane of the camera lens group may satisfy: TL/ImgH≤1.25. At least one of the surfaces from the object-side surface of the first lens to the image-side surface of the sixth lens is an aspheric surface.

According to an implementation of the present disclosure, a combined focal length f23 of the second lens and the third lens and an effective focal length f6 of the sixth lens may satisfy: 3.00<f23/f6<5.00.

According to an implementation of the present disclosure, an effective focal length f4 of the fourth lens and a distance BFL on the optical axis from the image-side surface of the sixth lens to the image plane of the camera lens group may satisfy: 5.00<f4/BFL<8.00.

According to an implementation of the present disclosure, a radius of curvature R9 of the object-side surface of the fifth lens and a radius of curvature R10 of the image-side surface of the fifth lens may satisfy: 3.00<R9/R10<6.00.

According to an implementation of the present disclosure, a radius of curvature R5 the object-side surface of the third lens and a radius of curvature R12 of the image-side surface of the sixth lens may satisfy: 6.00<R5/R12<15.00.

According to an implementation of the present disclosure, a center thickness CT1 of the first lens on the optical axis and a spacing distance T12 between the first lens and the second lens on the optical axis may satisfy: 2.00<CT1/T12<3.00.

According to an implementation of the present disclosure, a center thickness CT4 of the fourth lens on the optical axis and a center thickness CT6 of the sixth lens on the optical axis may satisfy: 6.00<(CT4+CT6)/(CT4−CT6)<10.00.

According to an implementation of the present disclosure, a distance SAG61 on the optical axis from an intersection point of the object-side surface of the sixth lens and the optical axis to a vertex of an effective radius of the object-side surface of the sixth lens, and a distance SAG62 on the optical axis from an intersection point of the image-side surface of the sixth lens and the optical axis to a vertex of an effective radius of the image-side surface of the sixth lens may satisfy: 2.00<(SAG61+SAG62)/(SAG61−SAG62)<7.00.

According to an implementation of the present disclosure, an edge thickness ET5 of the fifth lens and an edge thickness ET6 of the sixth lens may satisfy: 3.00<(ET5+ET6)/(ET6−ET5)<9.00.

According to an implementation of the present disclosure, a maximal effective radius DT61 of the object-side surface of the sixth lens and a maximal effective radius DT62 of the image-side surface of the sixth lens may satisfy: 13.00<(DT61+DT62)/(DT62−DT61)<20.00.

According to an implementation of the present disclosure, a maximal effective radius DT11 of the object-side surface of the first lens may satisfy: DT11≤0.75 mm.

According to an implementation of the present disclosure, a maximal field-of-view FOV of the camera lens group may satisfy: FOV>89.0°.

Another aspect of the present disclosure provides a camera lens group, which comprises, sequentially along an optical axis from an object side to an image side: a stop; a first lens having a positive refractive power, an object-side surface of the first lens is a convex surface, and an image-side surface of the first lens is a concave surface; a second lens having a refractive power, and an image-side surface of the second lens is a convex surface; a third lens having a negative refractive power, an object-side surface of the third lens is a convex surface, and an image-side surface of the third lens is a concave surface; a fourth lens having a positive refractive power, and an image-side surface of the fourth lens is a convex surface; a fifth lens having a positive refractive power, an object-side surface of the fifth lens is a concave surface, and an image-side surface of the fifth lens is a convex surface; and a sixth lens having a negative refractive power, an object-side surface of the sixth lens is a convex surface, and an image-side surface of the sixth lens is a concave surface. A center thickness CT1 of the first lens on the optical axis and a spacing distance T12 between the first lens and the second lens on the optical axis may satisfy: 2.00<CT1/T12<3.00. At least one of the surfaces from the object-side surface of the first lens to the image-side surface of the sixth lens is an aspheric surface.

According to an implementation of the present disclosure, a combined focal length f23 of the second lens and the third lens and an effective focal length f6 of the sixth lens may satisfy: 3.00<f23/f6<5.00.

According to an implementation of the present disclosure, an effective focal length f4 of the fourth lens and a distance BFL on the optical axis from the image-side surface of the sixth lens to an image plane of the camera lens group may satisfy: 5.00<f4/BFL<8.00.

According to an implementation of the present disclosure, a radius of curvature R9 of the object-side surface of the fifth lens and a radius of curvature R10 of the image-side surface of the fifth lens may satisfy: 3.00<R9/R10<6.00.

According to an implementation of the present disclosure, a radius of curvature R5 the object-side surface of the third lens and a radius of curvature R12 of the image-side surface of the sixth lens may satisfy: 6.00<R5/R12<15.00.

According to an implementation of the present disclosure, a center thickness CT4 of the fourth lens on the optical axis and a center thickness CT6 of the sixth lens on the optical axis may satisfy: 6.00<(CT4+CT6)/(CT4−CT6)<10.00.

According to an implementation of the present disclosure, a distance SAG61 on the optical axis from an intersection point of the object-side surface of the sixth lens and the optical axis to a vertex of an effective radius of the object-side surface of the sixth lens, and a distance SAG62 on the optical axis from an intersection point of the image-side surface of the sixth lens and the optical axis to a vertex of an effective radius of the image-side surface of the sixth lens may satisfy: 2.00<(SAG61+SAG62)/(SAG61−SAG62)<7.00.

According to an implementation of the present disclosure, an edge thickness ET5 of the fifth lens and an edge thickness ET6 of the sixth lens may satisfy: 3.00<(ET5+ET6)/(ET6−ET5)<9.00.

According to an implementation of the present disclosure, a maximal effective radius DT61 of the object-side surface of the sixth lens and a maximal effective radius DT62 of the image-side surface of the sixth lens may satisfy: 13.00<(DT61+DT62)/(DT62−DT61)<20.00.

According to an implementation of the present disclosure, a maximal effective radius DT11 of the object-side surface of the first lens may satisfy: DT11≤10.75 mm.

According to an implementation of the present disclosure, a maximal field-of-view FOV of the camera lens group may satisfy: FOV>89.0°.

According to an implementation of the present disclosure, a distance TTL on the optical axis from the object-side surface of the first lens to an image plane of the camera lens group and half of a diagonal length ImgH of an effective pixel area on the image plane of the camera lens group may satisfy: TTL/ImgH≤1.25.

By reasonably distributing the refractive powers and optimizing optical parameters, implementations of the present disclosure provides a camera lens group applicable to a portable electronic product and having characteristics of high pixel, small head and good imaging quality.

BRIEF DESCRIPTION OF THE DRAWINGS

After reading detailed descriptions of non-limiting examples given with reference to the following accompanying drawings, other features, objectives and advantages of the present disclosure will become more apparent:

FIGS. 6A to 6D respectively show a longitudinal aberration curve, an astigmatic curve, a distortion curve and a lateral color curve of the camera lens group according to Embodiment 3 of the present disclosure:

FIG. 7 is a schematic structural diagram of a camera lens group according to Embodiment 4 of the present disclosure;

FIG. 9 is a schematic structural diagram of a camera lens group according to Embodiment 5 of the present disclosure; and FIGS. 10A to 10D respectively show a longitudinal aberration curve, an astigmatic curve, a distortion curve and a lateral color curve of the camera lens group according to Embodiment 5 of the present disclosure.

DETAILED DESCRIPTION OF EMBODIMENTS

Figure 1:
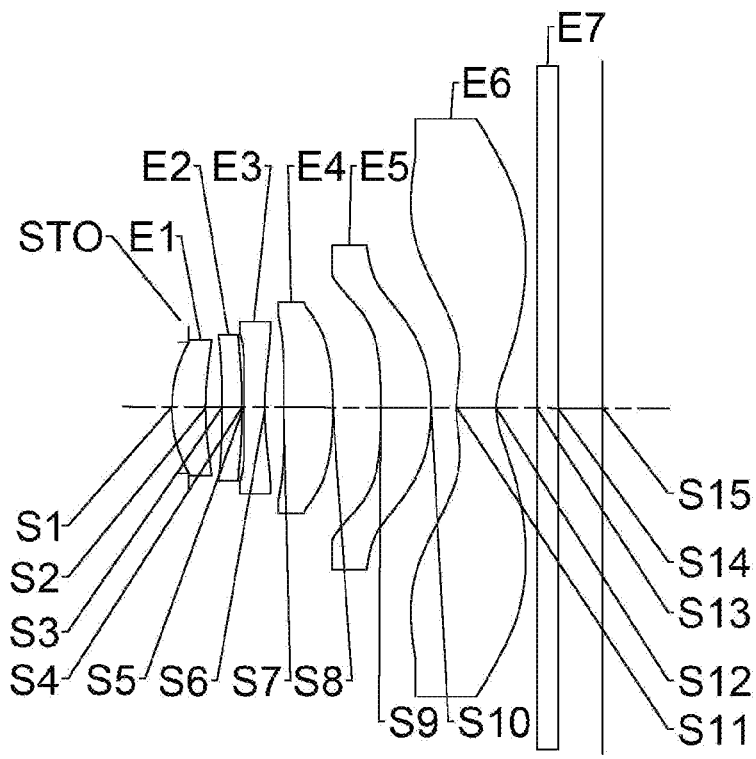
FIG. 1 is a schematic structural diagram of a camera lens group according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. A surface of each lens that is closest to a photographed object is referred to as the object-side surface of the lens, and a surface of the each lens that is closest to an image plane is referred to as the image-side surface of the lens.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should be noted that embodiments in the present disclosure and the features in the embodiments may be combined with each other on a non-conflict basis. Embodiments of the present disclosure will be described below in detail with reference to the accompanying drawings.

Features, principles and other aspects of the present disclosure are described below in detail.

A camera lens group according to exemplary implementations of the present disclosure may include six lenses having refractive powers, which are respectively a first lens, a second lens, a third lens, a fourth lens, a fifth lens and a sixth lens. The six lenses are arranged sequentially from an object side to an image side along an optical axis. Any two adjacent lenses in the first to sixth lenses may have a spacing distance.

In exemplary implementations, the first lens may have a positive refractive power, an object-side surface of the first lens may be a convex surface, and an image-side surface of the first lens may be a concave surface; the second lens may have a positive refractive power or a negative refractive power, and an image-side surface of the second lens may be a convex surface; the third lens may have a negative refractive power, an object-side surface of the third lens may be a convex surface, and an image-side surface of the third lens may be a concave surface; the fourth lens may have a positive refractive power, and an image-side surface of the fourth lens may be a convex surface; the fifth lens may have a positive refractive power, an object-side surface of the fifth lens may be a concave surface, and an image-side surface of the fifth lens may be a convex surface; and the sixth lens may have a negative refractive power, an object-side surface of the sixth lens may be a convex surface, and an image-side surface of the sixth lens may be a concave surface.

In exemplary implementations, by controlling the refractive powers and surface type characteristics of the lenses of the camera lens group, ensuring the camera lens group to have the characteristics of small head, large imaging range, small distortion and the like.

In exemplary implementations, the camera lens group according to embodiments of the present disclosure may satisfy: $TTL/ImgH \leq 1.25$. Here, TTL is a distance on the optical axis from the object-side surface of the first lens to the image plane of the camera lens group, and ImgH is half of a diagonal length of an effective pixel area on the image plane of the camera lens group. Satisfying $TTL/ImgH \leq 1.25$ can ensure miniaturization of the camera lens group, and be conducive to improving the imaging quality of the camera lens group.

In exemplary implementations, the camera lens group according to embodiments of the present disclosure may satisfy: $3.00 < f23/f6 < 5.00$. Here, f23 is a combined focal length of the second lens and the third lens, and f6 is an effective focal length of the sixth lens. More particularly, f23 and f6 may further satisfy: $3.10 < f23/f6 < 4.70$. Satisfying $3.00 < f23/f6 < 5.00$ is conducive to better balancing aberrations of the camera lens group and improving the imaging quality of the camera lens group.

In exemplary implementations, the camera lens group according to embodiments of the present disclosure may satisfy: $5.00 < f4/BFL < 8.00$. Here, f4 is an effective focal length of the fourth lens, and BFL is a distance on the optical axis from the image-side surface of the sixth lens to the image plane of the camera lens group. More particularly, f4 and BFL may further satisfy: $5.70 < f4/BFL < 7.70$. By satisfying $5.00 < f4/BFL < 8.00$, the shape of the fourth lens can be effectively controlled, and then the deflection angle of light at the fourth lens can be effectively controlled, thus the molding processability of the fourth lens can be ensured.

In exemplary implementations, the camera lens group according to embodiments of the present disclosure may satisfy: $3.00 < R9/R10 < 6.00$. Here, R9 is a radius of curvature of an object-side surface of the fifth lens, and R10 is a radius of curvature of an image-side surface of the fifth lens. More particularly. R9 and R10 may further satisfy: $3.50 < R9/R10 < 5.10$. By satisfying $3.00 < R9/R10 < 6.00$, the aberrations and distortion of the camera lens group can be effectively reduced, and the imaging quality of the camera lens group cam be improved.

In exemplary implementations, the camera lens group according to embodiments of the present disclosure may satisfy: $6.00 < R5/R12 < 15.00$. Here, R5 is a radius of curvature of an object-side surface of the third lens, and R12 is a radius of curvature of the image-side surface of the sixth lens. More particularly. R5 and R12 may further satisfy: $6.70 < R5/R12 < 14.50$. By satisfying $6.00 < R5/R12 < 15.00$, the aberrations and distortion of the camera lens group can be effectively reduced, and the imaging quality of the camera lens group cam be improved.

In exemplary implementations, the camera lens group according to embodiments of the present disclosure may satisfy: $2.00 < CT1/T12 < 3.00$. Here, CT1 is a center thickness of the first lens on the optical axis, and T12 is a spacing distance on the optical axis between the first lens and the second lens. By satisfying $2.00 < CT1/T12 < 3.00$, the size of the camera lens group can be effectively reduced, ensuring miniaturization of the camera lens group.

In exemplary implementations, the camera lens group according to embodiments of the present disclosure may satisfy: $6.00 < (CT4+CT6)/(CT4-CT6) < 10.00$. Here, CT4 is a center thickness of the fourth lens on the optical axis, and CT6 is a center thickness of the sixth lens on the optical axis. More particularly. CT4 andCT6 may further satisfy: $6.00 < (CT4+CT6)/(CT4-CT6) < 9.70$. By satisfying $6.00 < (CT4+CT6)/(CT4-CT6) < 10.00$, the amount of contribution of the fourth lens and the sixth lens to the distortion can be reasonably controlled, such that the amount of contribution of each field-of-view in the camera lens group to the distortion can be reasonably controlled, which is conducive to meeting the requirements of later software debugging.

In exemplary implementations, the camera lens group according to embodiments of the present disclosure may satisfy: $2.00 < (SAG61+SAG62)/(SAG61-SAG62) < 7.00$. Here, SAG61 is a distance on the optical axis from an intersection point of an object-side surface of the sixth lens and the optical axis to a vertex of an effective radius of the object-side surface of the sixth lens, and SAG62 is a distance on the optical axis from an intersection point of an image-side surface of the sixth lens and the optical axis to a vertex of an effective radius of the image-side surface of the sixth lens. More particularly, SAG61 and SAG62 may further satisfy: $2.30 < (SAG61+SAG62)/(SAG61-SAG62) < 6.50$. By satisfying $2.00 < (SAG61+SAG62)/(SAG61-SAG62) < 7.00$, not only the shape of the sixth lens can be effectively controlled and the processability of the sixth lens can be improved, but also the direction of the light in the edge field of view can be controlled, so that the camera lens group can better match the corresponding chip to improve the imaging quality.

In exemplary implementations, the camera lens group according to embodiments of the present disclosure may satisfy: $3.00 < (ET5+ET6)/(ET6-ET5) < 9.00$. Here, ET5 is an edge thickness of the fifth lens, and ET6 is an edge thickness of the sixth lens. More particularly, ET5 and ET6 may further satisfy: 3.30<(ET5+ET6)/(ET6−ET5)<8.70. By satisfying 3.00<(ET5+ET6)/(ET6−ET5)<9.00, the edge thicknesses of the fifth lens and the sixth lens can be reasonably controlled, which makes the structural distribution of the camera lens group more reasonable and ensures the processability of the camera lens group.

In exemplary implementations, the camera lens group according to embodiments of the present disclosure may satisfy: 13.00<(DT61+DT62)/(DT62−DT61)<20.00. Here, DT61 is a maximal effective radius of the object-side surface of the sixth lens, and DT62 is a maximal effective radius of the image-side surface of the sixth lens. By satisfying 13.00<(DT61+DT62)/(DT62−DT61)<20.00, not only the shape of the sixth lens can be effectively controlled and the processability of the sixth lens can be improved, but also the direction of the light in the edge field of view can be controlled, so that the camera lens group can better match the corresponding chip to improve the imaging quality.

In exemplary implementations, the camera lens group according to embodiments of the present disclosure may satisfy: DT11<0.75 mm. Here, DT11 is a maximal effective radius of the object-side surface of the first lens. Satisfying DT11≤0.75 mm is conducive to reducing the size of the head of the camera lens group and ensuring miniaturization of the camera lens group, and helps to improve the imaging quality of the camera lens group.

In exemplary implementations, the camera lens group according to embodiments of the present disclosure may satisfy: FOV>89.0°. Here, FOV is a maximal field-of-view of the camera lens group. By satisfying FOV>89.0°, the camera lens group can have a large imaging range.

In exemplary implementations, the camera lens group according to embodiments of the present disclosure may further include a stop provided between the object side and the first lens. Optionally, the above-mentioned camera lens group may further include a filter for correcting color deviation and/or a protective glass for protecting the photosensitive element located on the imaging plane. Embodiments of the present disclosure propose a camera lens group with features such as small head, high pixel, and high imaging quality. The camera lens group provided by embodiments of the present disclosure may be used as a front lens of a mobile phone, and has the characteristics of small head, small wide angle, small distortion and the like. The head of the camera lens group is small, which can reduce the size of the front lens of the mobile phone as much as possible and improve the screen-to-body ratio of the mobile phone. The camera lens group has a large imaging range and clearer image quality, which can enable consumers to have a better visual experience.

The camera lens group according to the above-mentioned embodiments of the present disclosure may employ multiple lenses, such as the above six lenses. By reasonably distributing the refractive powers, surface types, center thicknesses of the lenses, and on-axis distances between the lenses, it can effectively converge the incident light, reduce the total optical length of the imaging lens assembly, and improve the workability of the imaging lens assembly, making the camera lens group more conducive to production and processing.

In implementations of the present disclosure, at least one of the surfaces of the lenses is an aspheric surface. That is, at least one of the surfaces from the object-side surface of the first lens to the image-side surface of the sixth lens is an aspheric surface. Aspheric lens is characterized in that the curvature continuously changes from the center of the lens to the periphery of the lens. Different from a spherical lens having a constant curvature from the center of the lens to the periphery of the lens, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality. Alternatively, at least one of the object-side surface and the image-side surface of each of the first lens, the second lens, the third lens, the fourth lens, the fifth lens and the sixth lens is an aspheric surface. Alternatively, both the object-side surface and the image-side surface of each of the first lens, the second lens, the third lens, the fourth lens, the fifth lens and the sixth lens are aspheric surfaces.

However, it should be understood by those skilled in the art that the various results and advantages described in the present specification may be obtained by changing the number of the lenses constituting the camera lens group without departing from the technical solution claimed by the present disclosure. For example, although the camera lens group having six lenses is described as an example in the implementations, the camera lens group is not limited to the six lenses. If desired, the camera lens group may also include other numbers of lenses.

Detailed embodiments of the camera lens group that may be applied to the above implementations are further described below with reference to the accompanying drawings.

Embodiment 1

A camera lens group according to Embodiment 1 of the present disclosure is described below with reference to FIGS. 1 to 2D. FIG. 1 is a schematic structural diagram of the camera lens group according to Embodiment 1 of the present disclosure.

As shown in FIG. 1, the camera lens group includes, sequentially from an object side to an image side, a stop STO, a first lens E1, a second lens E2, a third lens E3, a fourth lens E4, a fifth lens E5, a sixth lens E6, an optical filter E7 and an image plane S15.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a concave surface, and an image-side surface S4 of the second lens E2 is a convex surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a positive refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a convex surface, and an image-side surface S12 of the sixth lens E6 is a concave surface. The optical filter E7 has an object-side surface S13 and an image-side surface S14. Light from an object sequentially passes through the surfaces S1 to S14, and finally forms an image on the image plane S15.

Table 1 is a table showing basic parameters of the camera lens group in Embodiment 1. Here, the units of a radius of curvature, a thickness/distance and a focal length are millimeters (mm).

TABLE 1

| surface number | surface type | radius of curvature | Thickness/ Distance | material refractive index | abbe number | focal length | conic coefficient |
|---|---|---|---|---|---|---|---|
| OBJ | spherical | infinite | infinite | | | | |
| STO | spherical | infinite | −0.1658 | | | | |
| S1 | aspheric | 1.3864 | 0.3353 | 1.54 | 56.1 | 4.15 | 0.0992 |
| S2 | aspheric | 3.2658 | 0.1601 | | | | 7.3243 |
| S3 | aspheric | −18.7402 | 0.1988 | 1.67 | 19.2 | 19.23 | 45.8134 |
| S4 | aspheric | −7.7177 | 0.0194 | | | | 55.1603 |
| S5 | aspheric | 9.2968 | 0.2100 | 1.67 | 19.2 | −7.03 | −43.9349 |
| S6 | aspheric | 3.1201 | 0.1872 | | | | −36.5396 |
| S7 | aspheric | 62.8369 | 0.4855 | 1.54 | 56.1 | 8.07 | −90.0000 |
| S8 | aspheric | −4.7242 | 0.4777 | | | | 8.4704 |
| S9 | aspheric | −10.5748 | 0.4988 | 1.60 | 28.3 | 5.06 | 58.0255 |
| S10 | aspheric | −2.4225 | 0.2501 | | | | −0.0203 |
| S11 | aspheric | 1.2018 | 0.3937 | 1.53 | 55.7 | −3.46 | −13.9831 |
| S12 | aspheric | 0.6460 | 0.4046 | | | | −3.8910 |
| S13 | spherical | infinite | 0.2100 | 1.52 | 64.2 | | |
| S14 | spherical | infinite | 0.4460 | | | | |
| S15 | spherical | infinite | | | | | |

In this embodiment, a total effective focal length f of the camera lens group is 3.24 mm, and a total track length TTL of the camera lens group (i.e., a distance on an optical axis from the object-side surface S1 of the first lens E1 to the image plane S15 of the camera lens group) is 4.28 mm, half of a diagonal length ImgH of an effective pixel area on the image plane S15 of the camera lens group is 3.43 mm, half of a maximal field-of-view Semi-FOV of the camera lens group is 46.3°, and an aperture value Fno of the camera lens group is 2.51.

In Embodiment 1, both the object-side surface and the image-side surface of any lens in the first to sixth lenses E1 to E6 are aspheric surfaces, and the surface type x of each aspheric lens may be defined using, but not limited to, the following formula:

$$x = \frac{ch^2}{1+\sqrt{1-(k+1)c^2h^2}} + \Sigma A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and $A_i$ is the correction coefficient of an i-th order of the aspheric surface. Tables 2-1 and 2-2 below show the high-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ applicable to the aspheric surfaces S1 to S12 in Embodiment 1.

TABLE 2-1

| surface number | $A_4$ | $A_6$ | $A_8$ | $A_{10}$ | $A_{12}$ | $A_{14}$ | $A_{16}$ |
|---|---|---|---|---|---|---|---|
| S1 | 7.4337E−03 | 3.0116E−01 | −3.6901E+00 | 3.0087E+01 | −1.5344E+02 | 4.9632E+02 | −9.8617E+02 |
| S2 | −4.9471E−02 | −3.4008E−01 | 3.7907E+00 | −2.7926E+01 | 1.2909E+02 | −3.8202E+02 | 7.0112E+02 |
| S3 | −1.3575E−01 | 7.2987E−01 | −7.3453E+00 | 4.7005E+01 | −1.7835E+02 | 4.0262E+02 | −5.0861E+02 |
| S4 | −2.2022E−01 | 2.5257E+00 | −1.8753E+01 | 8.5301E+01 | −2.3151E+02 | 3.6585E+02 | −3.0819E+02 |
| S5 | −3.5359E−01 | 2.7686E+00 | −2.2548E+01 | 1.1366E+02 | −3.8626E+02 | 8.9499E+02 | −1.3830E+03 |
| S6 | −2.1961E−02 | 2.0112E−01 | −1.3633E+00 | 3.1454E+00 | −1.7148E+00 | −7.7158E+00 | 1.8522E+01 |
| S7 | −1.6602E−01 | 9.2259E−01 | −9.2076E+00 | 6.6218E+01 | −3.2338E+02 | 1.0820E+03 | −2.5098E+03 |
| S8 | −1.5083E−01 | −9.3989E−02 | 1.7600E+00 | −1.2620E+01 | 5.3507E+01 | −1.4833E+02 | 2.7769E+02 |
| S9 | −1.9322E−01 | 4.4422E−01 | −1.7264E+00 | 3.5548E−01 | 1.8976E+01 | −7.8849E+01 | 1.7470E+02 |
| S10 | −6.4034E−01 | 2.6591E+00 | −9.3392E+00 | 2.3913E+01 | −4.4713E+01 | 6.1893E+01 | −6.3889E+01 |
| S11 | −8.4815E−01 | 9.8985E−01 | −7.5410E−01 | 4.5257E−01 | −2.2763E−01 | 9.5079E−02 | −3.1424E−02 |
| S12 | −4.2544E−01 | 6.0529E−01 | −6.1378E−01 | 4.5792E−01 | −2.5359E−01 | 1.0471E−01 | −3.2327E−02 |

TABLE 2-2

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | 1.0965E+03 | −5.2201E+02 | 0.0000E+00 | 0.0000E+00 | 0.0000E+00 | 0.0000E+00 | 0.0000E+00 |
| S2 | −7.3246E+02 | 3.3263E+02 | 0 0000E+00 | 0.0000E+00 | 0.0000E+00 | 0.0000E+00 | 0.0000E+00 |
| S3 | 2.9678E+02 | −3.6809E+01 | 0 0000E+00 | 0.0000E+00 | 0.0000E+00 | 0.0000E+00 | 0.0000E+00 |
| S4 | 1.1296E+02 | −1.1527E+01 | 0.0000E+00 | 0.0000E+00 | 0.0000E+00 | 0.0000E+00 | 0.0000E+00 |
| S5 | 1.2936E+03 | −5.5136E+02 | 0.0000E+00 | 0.0000E+00 | 0.0000E+00 | 0.0000E+00 | 0.0000E+00 |
| S6 | −1.6463E+01 | 5.3006E+00 | 0.0000E+00 | 0.0000E+00 | 0.0000E+00 | 0.0000E+00 | 0.0000E+00 |
| S7 | 4.0318E+03 | −4.3994E+03 | 3.1102E+03 | −1.2840E+03 | 2.3471E+02 | 0.0000E+00 | 0.0000E+00 |

TABLE 2-2-continued

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S8 | −3.5417E+02 | 3.0391E+02 | −1.6824E+02 | 5.4452E+01 | −7.8555E+00 | 0.0000E+00 | 0.0000E+00 |
| S9 | −2.5035E+02 | 2.4517E+02 | −1.6615E+02 | 7.6844E+01 | −2.3206E+01 | 4.1347E+00 | −3.3046E−01 |
| S10 | 4.9171E+01 | −2.7965E+01 | 1.1538E+01 | −3.3450E+00 | 6.4454E−01 | −7.3999E−02 | 3.8268E−03 |
| S11 | 7.8396E−03 | −1.4243E−03 | 1.8196E−04 | −1.5554E−05 | 8.1307E−07 | −2.1295E−08 | 1.3745E−10 |
| S12 | 7.4515E−03 | −1.2727E−03 | 1.5841E−04 | −1.3932E−05 | 8.1877E−07 | −2.8806E−08 | 4.5811E−10 |

Figure 2A:
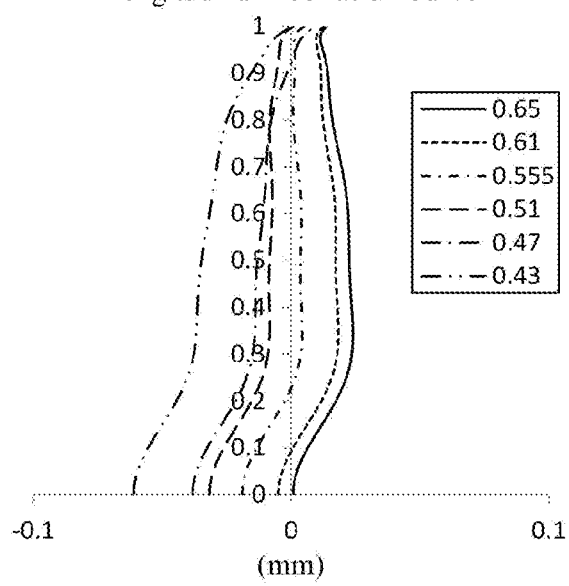
FIGS. 2A to 2D respectively show a longitudinal aberration curve, an astigmatic curve, a distortion curve and a lateral color curve of the camera lens group according to Embodiment 1 of the present disclosure.
Figure 2B:
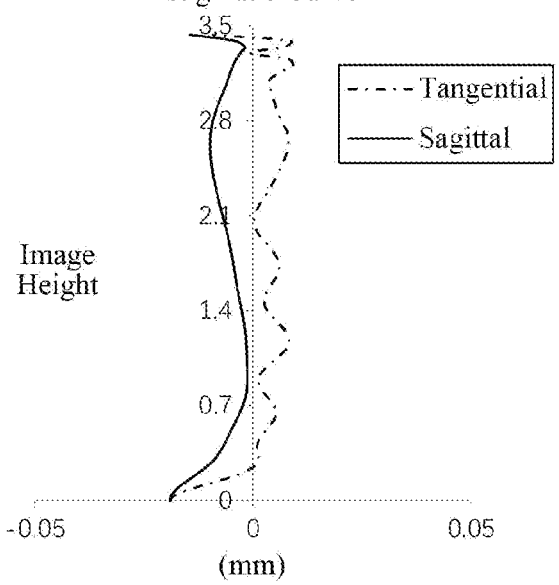
Figure 2C:
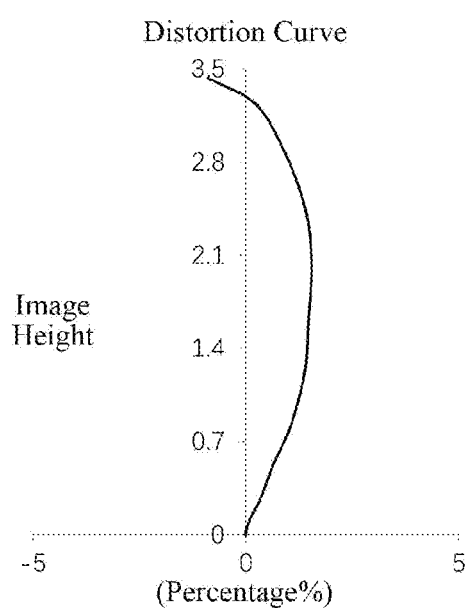
Figure 2D:
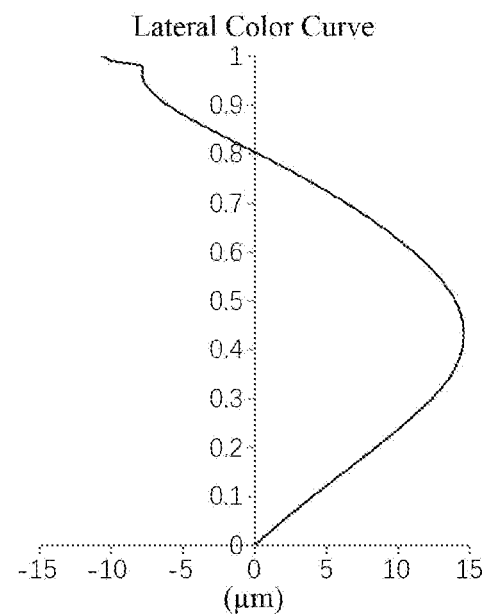

FIG. 2A illustrates a longitudinal aberration curve of the camera lens group in Embodiment 1, representing deviations of focal points of light of different wavelengths converged after passing through a lens assembly. FIG. 2B illustrates an astigmatic curve of the camera lens group in Embodiment 1, representing a curvature of a tangential image plane and a curvature of a sagittal image plane. FIG. 2C illustrates a distortion curve of the camera lens group in Embodiment 1, representing amounts of distortion corresponding to different image heights. FIG. 2D illustrates a lateral color curve of the camera lens group in Embodiment 1, representing deviations of different image heights on the image plane after light passes through the lens assembly. It can be seen from FIGS. 2A to 2D that the camera lens group given in Embodiment 1 can achieve a good imaging quality.

Embodiment 2

Figure 3:
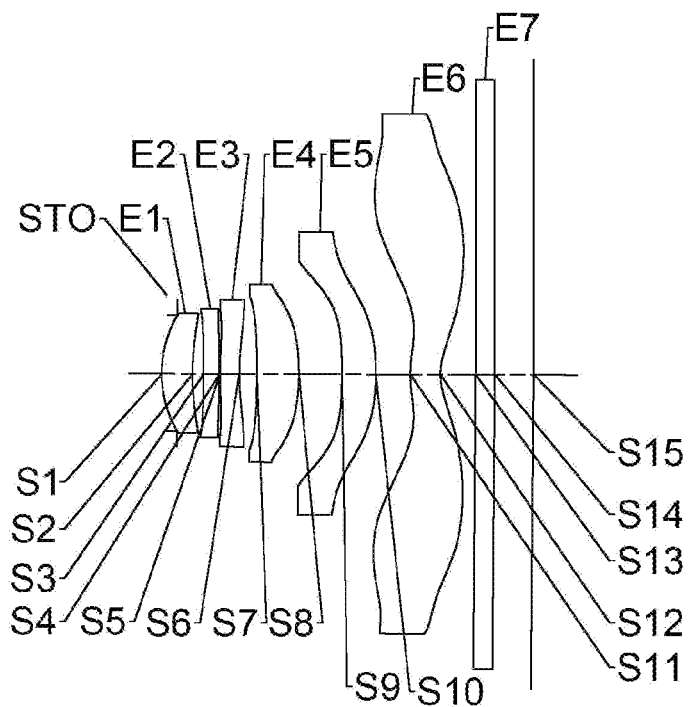
FIG. 3 is a schematic structural diagram of a camera lens group according to Embodiment 2 of the present disclosure.

A camera lens group according to Embodiment 2 of the present disclosure is described below with reference to FIGS. 3 to 4D. In this embodiment and the following embodiments, for the sake of brevity, some descriptions similar to those in Embodiment 1 will be omitted. FIG. 3 is a schematic structural diagram of the camera lens group according to Embodiment 2 of the present disclosure.

As shown in FIG. 3, the camera lens group includes, sequentially from an object side to an image side, a stop STO, a first lens E1, a second lens E2, a third lens E3, a fourth lens E4, a fifth lens E5, a sixth lens E6, an optical filter E7 and an image plane S15.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a convex surface, and an image-side surface S4 of the second lens E2 is a convex surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a concave surface, and an image-side surface S8 of the fourth lens E4 is a convex surface. The fifth lens E5 has a positive refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a convex surface, and an image-side surface S12 of the sixth lens E6 is a concave surface. The optical filter E7 has an object-side surface S13 and an image-side surface S14. Light from an object sequentially passes through the surfaces S1 to S14, and finally forms an image on the image plane S15.

In this embodiment, a total effective focal length f of the camera lens group is 3.23 mm, and a total track length TTL of the camera lens group is 4.07 mm, half of a diagonal length ImgH of an effective pixel area on the image plane S15 of the camera lens group is 3.25 mm, half of a maximal field-of-view Semi-FOV of the camera lens group is 44.6°, and an aperture value Fno of the camera lens group is 2.51.

Table 3 is a table showing basic parameters of the camera lens group in Embodiment 2. Here, the units of a radius of curvature, a thickness/distance and a focal length are millimeters (mm). Tables 4-1 and 4-2 show the high-order coefficients applicable to the aspheric surfaces in Embodiment 2. Here, the surface type of each aspheric surface may be defined using the formula (1) given in Embodiment 1.

TABLE 3

| surface number | surface type | radius of curvature | Thickness/ distance | material refractive index | abbe number | focal length | conic coefficient |
|---|---|---|---|---|---|---|---|
| OBJ | spherical | infinite | infinite | | | | |
| STO | spherical | infinite | −0.1725 | | | | |
| S1 | aspheric | 1.3293 | 0.3370 | 1.54 | 56.1 | 4.50 | 0.0949 |
| S2 | aspheric | 2.6369 | 0.1216 | | | | 2.8895 |
| S3 | aspheric | 113.7177 | 0.1717 | 1.67 | 19.2 | 27.20 | 4.9807 |
| S4 | aspheric | −21.9799 | 0.0080 | | | | −89.1860 |
| S5 | aspheric | 4.6406 | 0.2100 | 1.67 | 19.2 | −9.98 | −9.5733 |
| S6 | aspheric | 2.7016 | 0.1932 | | | | −36.1116 |
| S7 | aspheric | −30.1468 | 0.4598 | 1.54 | 56.1 | 5.97 | 90.0000 |
| S8 | aspheric | −2.9576 | 0.4690 | | | | 1.5358 |
| S9 | aspheric | −12.4917 | 0.3713 | 1.60 | 28.3 | 7.67 | 65.3777 |
| S10 | aspheric | −3.4305 | 0.3769 | | | | 0.6997 |
| S11 | aspheric | 1.2409 | 0.3298 | 1.53 | 55.7 | −3.47 | −10.7439 |
| S12 | aspheric | 0.6755 | 0.3830 | | | | −4.0970 |
| S13 | spherical | infinite | 0.2100 | 1.52 | 64.2 | | |
| S14 | spherical | infinite | 0.4245 | | | | |
| S15 | spherical | infinite | | | | | |

TABLE 4-1

| surface number | $A_4$ | $A_6$ | $A_8$ | $A_{10}$ | $A_{12}$ | $A_{14}$ | $A_{16}$ |
|---|---|---|---|---|---|---|---|
| S1 | −4.8199E−02 | 1.4782E+00 | −1.6408E+01 | 1.0473E+02 | −4.0860E+02 | 1.0120E+03 | −1.5756E+03 |
| S2 | −9.6721E−02 | −6.8609E−01 | 1.0279E+01 | −1.0131E+02 | 6.2113E+02 | −2.3694E+03 | 5.5118E+03 |
| S3 | −1.3688E−01 | −3.3726E−01 | 5.4696E+00 | −6.8712E+01 | 5.1926E+02 | −2.2347E+03 | 5.5365E+03 |
| S4 | 8.0279E−02 | −9.0795E−01 | −1.6574E+00 | 3.7494E+01 | −1.4960E+02 | 2.9167E+02 | −3.1964E+02 |
| S5 | −5.8123E−02 | −6.4206E−01 | −3.4263E+00 | 4.1837E+01 | −1.8109E+02 | 4.5981E+02 | −7.7872E+02 |
| S6 | 3.8046E−02 | −2.9807E−01 | 1.3779E+00 | −1.0822E+01 | 4.9420E+01 | −1.2652E+02 | 1.8111E+02 |
| S7 | −1.9974E−01 | 1.2691E+00 | −1.5126E+01 | 1.2543E+02 | −7.0241E+02 | 2.7042E+03 | −7.2347E+03 |
| S8 | −1.6946E−01 | −9.7401E−01 | 1.3643E+01 | −1.0455E+02 | 5.0742E+02 | −1.6449E+03 | 3.6473E+03 |
| S9 | −3.6014E−01 | 1.2418E+00 | −9.1161E+00 | 4.5893E+01 | −1.6548E+02 | 4.3406E+02 | −8.3392E+02 |
| S10 | −4.6824E−01 | 1.6238E+00 | −5.9045E+00 | 1.5807E+01 | −3.0292E+01 | 4.2128E+01 | −4.2733E+01 |
| S11 | −8.1435E−01 | 9.3376E−01 | −7.1302E−01 | 4.5008E−01 | −2.5103E−01 | 1.1830E−01 | −4.3598E−02 |
| S12 | −4.2809E−01 | 5.6624E−01 | −5.2524E−01 | 3.5308E−01 | −1.7304E−01 | 6.1735E−02 | −1.5955E−02 |

TABLE 4-2

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | 1.4341E+03 | −5.9201E+02 | 0.0000E+00 | 0.0000E+00 | 0.0000E+00 | 0.0000E+00 | 0.0000E+00 |
| S2 | −7.1752E+03 | 3.9941E+03 | 0.0000E+00 | 0.0000E+00 | 0.0000E+00 | 0.0000E+00 | 0.0000E+00 |
| S3 | −7.4263E+03 | 4.1747E+03 | 0.0000E+00 | 0.0000E+00 | 0.0000E+00 | 0.0000E+00 | 0.0000E+00 |
| S4 | 2.0994E+02 | −7.7188E+01 | 0.0000E+00 | 0.0000E+00 | 0.0000E+00 | 0.0000E+00 | 0.0000E+00 |
| S5 | 8.4835E+02 | −4.3635E+02 | 0.0000E+00 | 0.0000E+00 | 0.0000E+00 | 0.0000E+00 | 0.0000E+00 |
| S6 | −1.3370E+02 | 3.8804E+01 | 0.0000E+00 | 0.0000E+00 | 0.0000E+00 | 0.0000E+00 | 0.0000E+00 |
| S7 | 1.3401E+04 | −1.6814E+04 | 1.3584E+04 | −6.3451E+03 | 1.2931E+03 | 0.0000E+00 | 0.0000E+00 |
| S8 | −5.5526E+03 | 5.7089E+03 | −3.7883E+03 | 1.4645E+03 | −2.5047E+02 | 0.0000E+00 | 0.0000E+00 |
| S9 | 1.1771E+03 | −1.2156E+03 | 9.0566E+02 | −4.7292E+02 | 1.6398E+02 | −3.3865E+01 | 3.1487E+00 |
| S10 | 3.1764E+01 | −1.7340E+01 | 6.9113E+00 | −1.9701E+00 | 3.8290E−01 | −4.5673E−02 | 2.5286E−03 |
| S11 | 1.1957E−02 | −2.3794E−03 | 3.3680E−04 | −3.2950E−05 | 2.1142E−06 | −7.9951E−08 | 1.3491E−09 |
| S12 | 2.9508E−03 | −3.8077E−04 | 3.2528E−05 | −1.6216E−06 | 2.7521E−08 | 1.2214E−09 | −5.1126E−11 |

Figure 4A:
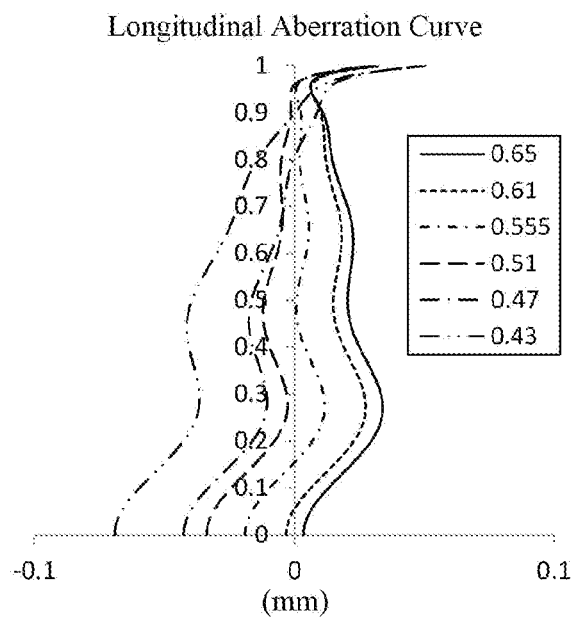
FIGS. 4A to 4D respectively show a longitudinal aberration curve, an astigmatic curve, a distortion curve and a lateral color curve of the camera lens group according to Embodiment 2 of the present disclosure.
Figure 4B:
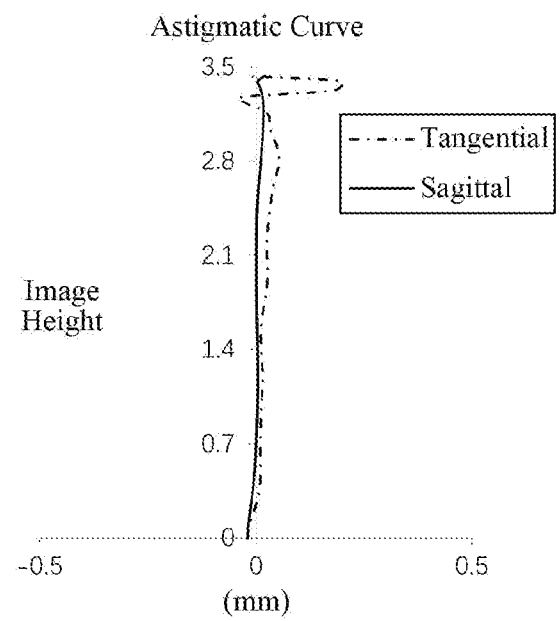
Figure 4C:
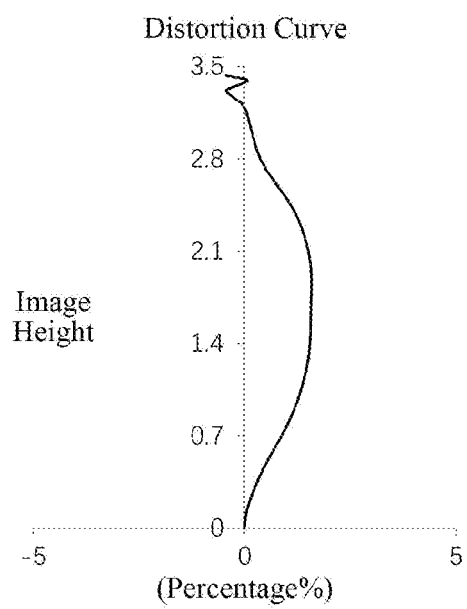
Figure 4D:
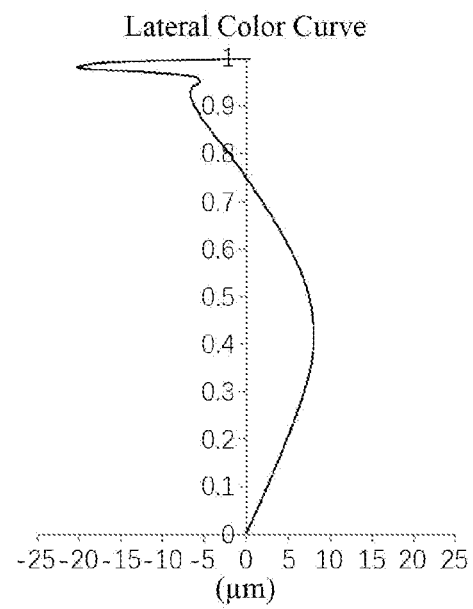

FIG. 4A illustrates a longitudinal aberration curve of the camera lens group in Embodiment 2, representing deviations of focal points of light of different wavelengths converged after passing through a lens assembly. FIG. 4B illustrates an astigmatic curve of the camera lens group in Embodiment 2, representing a curvature of a tangential image plane and a curvature of a sagittal image plane. FIG. 4C illustrates a distortion curve of the camera lens group in Embodiment 2, representing amounts of distortion corresponding to different image heights. FIG. 4D illustrates a lateral color curve of the camera lens group in Embodiment 2, representing deviations of different image heights on the image plane after light passes through the lens assembly. It can be seen from FIGS. 4A to 4D that the camera lens group given in Embodiment 2 can achieve a good imaging quality.

Embodiment 3

Figure 5:
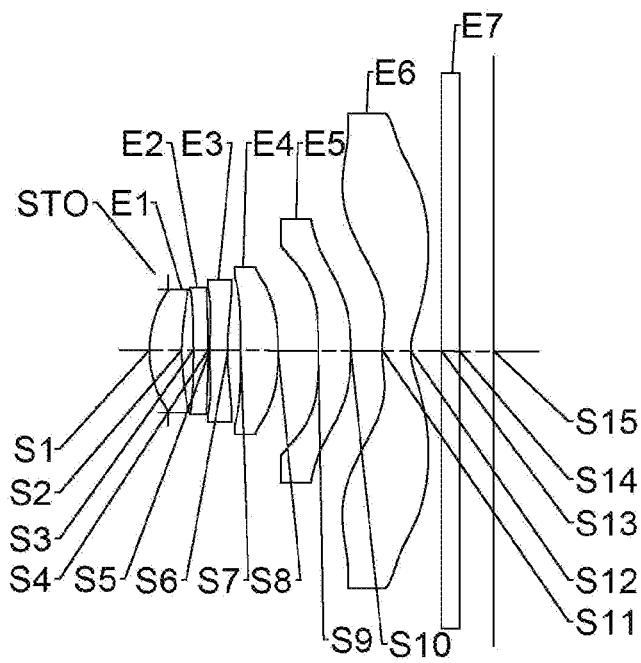
FIG. 5 is a schematic structural diagram of a camera lens group according to Embodiment 3 of the present disclosure.

A camera lens group according to Embodiment 3 of the present disclosure is described below with reference to FIGS. 5 to 6D. FIG. 5 is a schematic structural diagram of the camera lens group according to Embodiment 3 of the present disclosure.

As shown in FIG. 5, the camera lens group includes, sequentially from an object side to an image side, a stop STO, a first lens E1, a second lens E2, a third lens E3, a fourth lens E4, a fifth lens E5, a sixth lens E6, an optical filter E7 and an image plane S15.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a concave surface, and an image-side surface S4 of the second lens E2 is a convex surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a concave surface, and an image-side surface S8 of the fourth lens E4 is a convex surface. The fifth lens E5 has a positive refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a convex surface, and an image-side surface S12 of the sixth lens E6 is a concave surface. The optical filter E7 has an object-side surface S13 and an image-side surface S14. Light from an object sequentially passes through the surfaces S1 to S14, and finally forms an image on the image plane S15.

In this embodiment, a total effective focal length f of the camera lens group is 3.23 mm, and a total track length TTL of the camera lens group is 4.03 mm, half of a diagonal length ImgH of an effective pixel area on the image plane S15 of the camera lens group is 3.43 mm, half of a maximal field-of-view Semi-FOV of the camera lens group is 46.3°, and an aperture value Fno of the camera lens group is 2.27.

Table 5 is a table showing basic parameters of the camera lens group in Embodiment 3. Here, the units of a radius of curvature, a thickness/distance and a focal length are millimeters (mm). Tables 6-1 and 6-2 show the high-order coefficients applicable to the aspheric surfaces in Embodiment 3. Here, the surface type of each aspheric surface may be defined using the formula (1) given in Embodiment 1.

TABLE 5

| surface number | surface type | radius of curvature | Thickness/ distance | material refractive index | abbe number | focal length | conic coefficient |
|---|---|---|---|---|---|---|---|
| OBJ | spherical | infinite | infinite | | | | |
| STO | spherical | infinite | −0.2244 | | | | |
| S1 | aspheric | 1.2909 | 0.3779 | 1.54 | 56.1 | 4.12 | 0.0493 |
| S2 | aspheric | 2.7172 | 0.1357 | | | | 5.4497 |
| S3 | aspheric | −26.4940 | 0.1746 | 1.67 | 19.2 | 40.45 | −90.0000 |
| S4 | aspheric | −13.5072 | 0.0190 | | | | 71.8599 |
| S5 | aspheric | 6.1310 | 0.2100 | 1.67 | 19.2 | −9.90 | −32.2340 |
| S6 | aspheric | 3.1584 | 0.1516 | | | | −47.1433 |
| S7 | aspheric | −85.1715 | 0.4382 | 1.54 | 56.1 | 5.94 | 90.0000 |
| S8 | aspheric | −3.1283 | 0.4710 | | | | −1.0003 |
| S9 | aspheric | −13.1857 | 0.3804 | 1.60 | 28.3 | 7.79 | 76.4590 |
| S10 | aspheric | −3.5176 | 0.3673 | | | | 1.4607 |
| S11 | aspheric | 1.4019 | 0.3341 | 1.53 | 55.7 | −3.18 | −12.4695 |
| S12 | aspheric | 0.7059 | 0.3594 | | | | −4.4908 |
| S13 | spherical | infinite | 0.2100 | 1.52 | 64.2 | | |
| S14 | spherical | infinite | 0.4008 | | | | |
| S15 | spherical | infinite | | | | | |

TABLE 6-1

| surface number | $A_4$ | $A_6$ | $A_8$ | $A_{10}$ | $A_{12}$ | $A_{14}$ | $A_{16}$ |
|---|---|---|---|---|---|---|---|
| S1 | −2.1861E−02 | 7.1577E−01 | −7.8600E+00 | 5.3374E+01 | −2.2330E+02 | 5.8408E+02 | −9.2707E+02 |
| S2 | −8.6307E−02 | −8.0849E−02 | −5.1250E−01 | 8.1854E+00 | −5.3497E+01 | 2.0327E+02 | −4.6387E+02 |
| S3 | −1.2198E−01 | 1.9588E−01 | −1.3877E+00 | 2.1191E+00 | 3.1993E+01 | −1.8783E+02 | 4.3362E+02 |
| S4 | −2.8228E−02 | −5.2222E−01 | 9.8720E+00 | −9.2234E+01 | 4.8276E+02 | −1.4751E+03 | 2.6210E+03 |
| S5 | −1.8132E−01 | 2.6623E−01 | −1.8194E−01 | −1.9340E+01 | 1.3223E+02 | −4.1991E+02 | 7.1275E+02 |
| S6 | −1.4712E−07 | −1.4070E−01 | 1.1091E+00 | −9.2998E+00 | 3.8690E+01 | −9.2795E+01 | 1.3335E+02 |
| S7 | −2.5432E−01 | 2.4809E+00 | −3.2361E+01 | 2.8121E+02 | −1.6298E+03 | 6.4500E+03 | −1.7663E+04 |
| S8 | −1.2658E−01 | −1.4560E+00 | 1.7470E+01 | −1.2313E+02 | 5.6387E+02 | −1.7497E+03 | 3.7464E+03 |
| S9 | −2.5426E−01 | 1.9497E−01 | −3.5911E−01 | −1.7106E+00 | 1.2077E+01 | −3.3287E+01 | 5.2825E+01 |
| S10 | −4.1838E−01 | 1.0581E+00 | −2.6368E+00 | 4.3388E+00 | −3.0234E+00 | −3.2460E+00 | 1.1086E+01 |
| S11 | −1.0077E+00 | 1.2820E+00 | −1.0686E+00 | 7.0634E−01 | −3.9484E−01 | 1.8490E−01 | −6.9108E−02 |
| S12 | −5.0776E−01 | 7.5075E−01 | −7.7246E−01 | 5.7626E−01 | −3.1549E−01 | 1.2750E−01 | −3.8194E−02 |

TABLE 6-2

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | 8.1583E+02 | −3.0465E+02 | 0.0000E+00 | 0.0000E+00 | 0.0000E+00 | 0.0000E+00 | 0.0000E+00 |
| S2 | 5.9280E+02 | −3.2860E+02 | 0.0000E+00 | 0.0000E+00 | 0.0000E+00 | 0.0000E+00 | 0.0000E+00 |
| S3 | −4.4857E+02 | 1.5474E+02 | 0.0000E+00 | 0.0000E+00 | 0.0000E+00 | 0.0000E+00 | 0.0000E+00 |
| S4 | −2.4951E+03 | 9.7635E+02 | 0.0000E+00 | 0.0000E+00 | 0.0000E+00 | 0.0000E+00 | 0.0000E+00 |
| S5 | −6.0390E+02 | 1.9126E+02 | 0.0000E+00 | 0.0000E+00 | 0.0000E+00 | 0.0000E+00 | 0.0000E+00 |
| S6 | −1.0679E+02 | 3.6537E+01 | 0.0000E+00 | 0.0000E+00 | 0 0000E+00 | 0.0000E+00 | 0.0000E+00 |
| S7 | 3.3413E+04 | −4.2807E+04 | 3.5421E+04 | −1.7069E+04 | 3.6362E+03 | 0.0000E+00 | 0.0000E+00 |
| S8 | −5.5369E+03 | 5.5434E+03 | −3.5867E+03 | 1.3523E+03 | −2.2549E+02 | 0.0000E+00 | 0.0000E+00 |
| S9 | −5.1919E+01 | 3.1659E+01 | −1.1897E+01 | 3.4352E+00 | −1.4703E+00 | 6.0973E−01 | −1.0623E−01 |
| S10 | −1.4327E+01 | 1.1282E+01 | −5.8760E+00 | 2.0414E+00 | −4.5666E−01 | 5.9670E−02 | −3.4683E−03 |
| S11 | 1.9718E−02 | −4.1671E−03 | 6.3601E−04 | −6.7847E−05 | 4.7861E−06 | −2.0017E−07 | 3.7499E−09 |
| S12 | 8.4829E−03 | −1.3889E−03 | 1.6515E−04 | −1.3852E−05 | 7.7573E−07 | −2.5983E−08 | 3.9279E−10 |

Figure 6A:
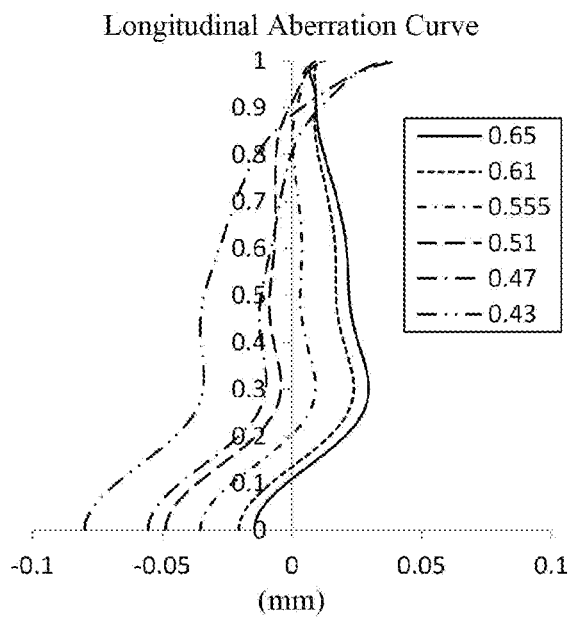
Figure 6B:
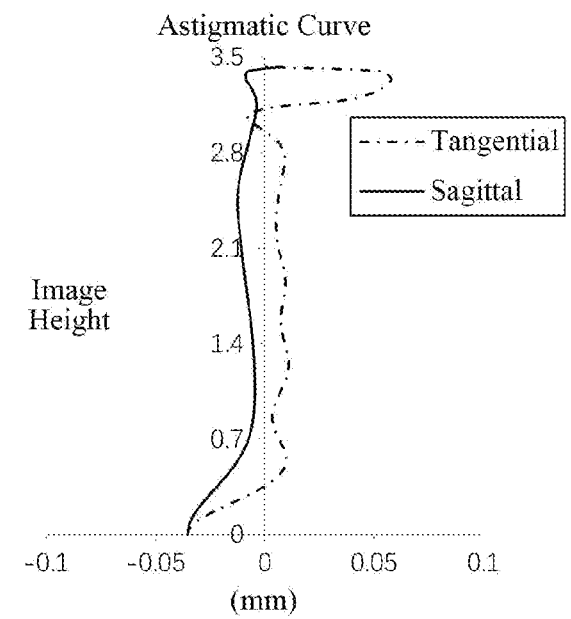

FIG. 6A illustrates a longitudinal aberration curve of the camera lens group in Embodiment 3, representing deviations of focal points of light of different wavelengths converged after passing through a lens assembly. FIG. 6B illustrates an astigmatic curve of the camera lens group in Embodiment 3, representing a curvature of a tangential image plane and a curvature of a sagittal image plane. FIG. 6C illustrates a distortion curve of the camera lens group in Embodiment 3, representing amounts of distortion corresponding to different image heights. FIG. 6D illustrates a lateral color curve of the camera lens group in Embodiment 3, representing deviations of different image heights on the image plane after light passes through the lens assembly. It can be seen from FIGS. 6A to 6D that the camera lens group given in Embodiment 3 can achieve a good imaging quality.

Embodiment 4

A camera lens group according to Embodiment 4 of the present disclosure is described below with reference to FIGS. 7 to 8D. FIG. 7 is a schematic structural diagram of the camera lens group according to Embodiment 4 of the present disclosure.

As shown in FIG. 7, the camera lens group includes, sequentially from an object side to an image side, a stop STO, a first lens E1, a second lens E2, a third lens E3, a fourth lens E4, a fifth lens E5, a sixth lens E6, an optical filter E7 and an image plane S15.

The first lens E1 has a positive refractive power, an object-side surface S1 of the first lens E1 is a convex surface, and an image-side surface S2 of the first lens E1 is a concave surface. The second lens E2 has a negative refractive power, an object-side surface S3 of the second lens E2 is a concave surface, and an image-side surface S4 of the second lens E2 is a convex surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a concave surface, and an image-side surface S8 of the fourth lens E4 is a convex surface. The fifth lens E5 has a positive refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a convex surface, and an image-side surface S12 of the sixth lens E6 is a concave surface. The optical filter E7 has an object-side surface S13 and an image-side surface S14. Light from an object sequentially passes through the surfaces S1 to S14, and finally forms an image on the image plane S15.

In this embodiment, a total effective focal length f of the camera lens group is 3.10 mm, and a total track length TTL of the camera lens group is 3.98 mm, half of a diagonal length ImgH of an effective pixel area on the image plane S15 of the camera lens group is 3.43 mm, half of a maximal field-of-view Semi-FOV of the camera lens group is 47.3°, and an aperture value Fno of the camera lens group is 2.22.

Table 7 is a table showing basic parameters of the camera lens group in Embodiment 4. Here, the units of a radius of curvature, a thickness/distance and a focal length are millimeters (mm). Tables 8-1 and 8-2 show the high-order coefficients applicable to the aspheric surfaces in Embodiment 4. Here, the surface type of each aspheric surface may be defined using the formula (1) given in Embodiment 1.

TABLE 7

| surface number | surface type | radius of curvature | Thickness/ distance | material refractive index | abbe number | focal length | conic coefficient |
|---|---|---|---|---|---|---|---|
| OBJ | spherical | infinite | infinite | | | | |
| STO | spherical | infinite | −0.2178 | | | | |
| S1 | aspheric | 1.2847 | 0.3706 | 1.54 | 56.1 | 4.19 | 0.0494 |
| S2 | aspheric | 2.6358 | 0.1299 | | | | 5.1153 |
| S3 | aspheric | −29.4070 | 0.1601 | 1.67 | 19.2 | −79.68 | −16.3995 |
| S4 | aspheric | −64.7281 | 0.0225 | | | | 89.9107 |
| S5 | aspheric | 4.5925 | 0.2100 | 1.67 | 19.2 | −17.53 | −25.1023 |
| S6 | aspheric | 3.2507 | 0.1418 | | | | −48.3004 |
| S7 | aspheric | −90.1906 | 0.4510 | 1.54 | 56.1 | 5.83 | −90.0000 |
| S8 | aspheric | −3.0790 | 0.4441 | | | | −0.0612 |
| S9 | aspheric | −18.3948 | 0.3851 | 1.60 | 28.3 | 7.45 | 72.9948 |
| S10 | aspheric | −3.6594 | 0.3545 | | | | 1.8209 |
| S11 | aspheric | 1.2960 | 0.3359 | 1.53 | 55.7 | −3.25 | −11.8074 |
| S12 | aspheric | 0.6765 | 0.3639 | | | | −4.3304 |
| S13 | spherical | infinite | 0.2100 | 1.52 | 64.2 | | |
| S14 | spherical | infinite | 0.4053 | | | | |
| S15 | spherical | infinite | | | | | |

TABLE 8-1

| surface number | $A_4$ | $A_6$ | $A_8$ | $A_{10}$ | $A_{12}$ | $A_{14}$ | $A_{16}$ |
|---|---|---|---|---|---|---|---|
| S1 | −4.1805E−02 | 1.1383E+00 | −1.2735E+01 | 8.7318E+01 | −3.7212E+02 | 9.9814E+02 | −1.6348E+03 |
| S2 | −7.8167E−02 | −3.6258E−01 | 2.3409E+00 | −8.9006E+00 | 4.2145E+00 | 1.0900E+02 | −4.4640E+02 |
| S3 | −1.3190E−01 | 5.7588E−01 | −6.7328E+00 | 4.3038E+01 | −1.5233E+02 | 3.2491E+02 | −4.4587E+02 |
| S4 | −9.6597E−03 | −8.8562E−01 | 1.2257E+01 | −1.0399E+02 | 5.4584E+02 | −1.7217E+03 | 3.1635E+03 |
| S5 | −1.3932E−01 | −2.0221E−01 | 3.0941E+00 | −3.6806E+01 | 2.0894E+02 | −6.5597E+02 | 1.1425E+03 |
| S6 | 8.2556E−03 | −2.0361E−01 | 1.3141E+00 | −1.0311E+01 | 4.4778E+01 | −1.1533E+02 | 1.7758E+02 |
| S7 | −3.1947E−01 | 3.8472E+00 | −4.9361E+01 | 4.1206E+02 | −2.2981E+03 | 8.7948E+03 | −2.3393E+04 |
| S8 | −9.2016E−02 | −2.3390E+00 | 2.7389E+01 | −1.9104E+02 | 8.6724E+02 | −2.6710E+03 | 5.6847E+03 |
| S9 | −3.3087E−01 | 1.1081E+00 | −6.8121E+00 | 2.8931E+01 | −8.8122E+01 | 1.9562E+02 | −3.1546E+02 |
| S10 | −5.0479E−01 | 1.6851E+00 | −5.3566E+00 | 1.2842E+01 | −2.2423E+01 | 2.9086E+01 | −2.8235E+01 |
| S11 | −1.0327E+00 | 1.3286E+00 | −1.1207E+00 | 7.5020E−01 | −4.2489E−01 | 2.0170E−01 | −7.6458E−02 |
| S12 | −5.1510E−01 | 7.5305E−01 | −7.6511E−01 | 5.6525E−01 | −3.0753E−01 | 1.2383E−01 | −3.7013E−02 |

TABLE 8-2

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | 1.4923E+03 | −5.8083E+02 | 0.0000E+00 | 0.0000E+00 | 0.0000E+00 | 0.0000E+00 | 0.0000E+00 |
| S2 | 7.3939E+02 | −4.6498E+02 | 0.0000E+00 | 0.0000E+00 | 0.0000E+00 | 0.0000E+00 | 0.0000E+00 |
| S3 | 4.1248E+02 | −2.1593E+02 | 0.0000E+00 | 0.0000E+00 | 0.0000E+00 | 0.0000E+00 | 0.0000E+00 |
| S4 | −3.0976E+03 | 1.2406E+03 | 0.0000E+00 | 0.0000E+00 | 0.0000E+00 | 0.0000E+00 | 0.0000E+00 |
| S5 | −1.0075E+03 | 3.3994E+02 | 0.0000E+00 | 0.0000E+00 | 0.0000E+00 | 0.0000E+00 | 0.0000E+00 |
| S6 | −1.4959E+02 | 5.2665E+01 | 0.0000E+00 | 0.0000E+00 | 0.0000E+00 | 0.0000E+00 | 0.0000E+00 |
| S7 | 4.3150E+04 | −5.4093E+04 | 4.3940E+04 | −2.0850E+04 | 4.3860E+03 | 0.0000E+00 | 0.0000E+00 |
| S8 | −8.3630E+03 | 8.3451E+03 | −5.3880E+03 | 2.0294E+03 | −3.3840E+02 | 0.0000E+00 | 0.0000E+00 |
| S9 | 3.6501E+02 | −2.9568E+02 | 1.5978E+02 | −5.1684E+01 | 6.8687E+00 | 8.6297E−01 | −2.9134E−01 |
| S10 | 2.0504E+01 | −1.1074E+01 | 4.3843E+00 | −1.2358E+00 | 2.3453E−01 | −2.6787E−02 | 1.3856E−03 |
| S11 | 2.2140E−02 | −4.7532E−03 | 7.3796E−04 | −8.0223E−05 | 5.7817E−06 | −2.4790E−07 | 4.7839E−09 |
| S12 | 8.2113E−03 | −1.3440E−03 | 1.5992E−04 | −1.3438E−05 | 7.5527E−07 | −2.5454E−08 | 3.8854E−10 |

Figure 8A:
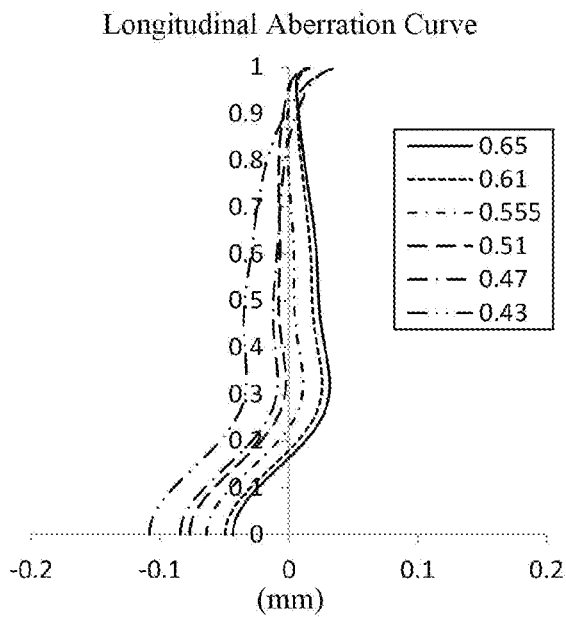
FIGS. 8A to 8D respectively show a longitudinal aberration curve, an astigmatic curve, a distortion curve and a lateral color curve of the camera lens group according to Embodiment 4 of the present disclosure.
Figure 8B:
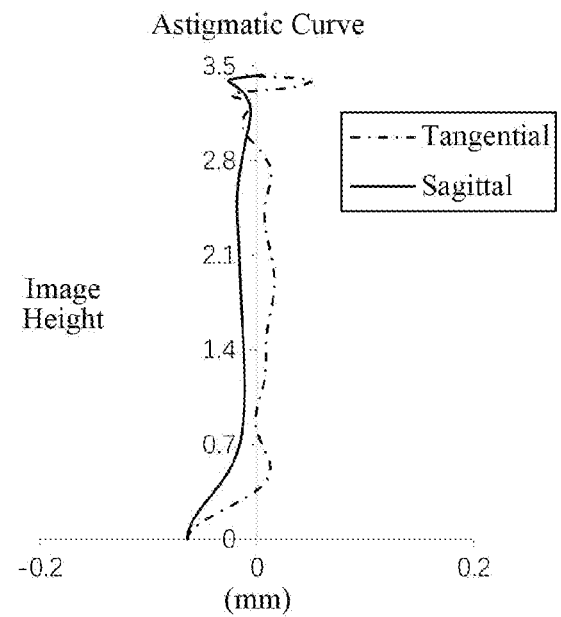
Figure 8C:
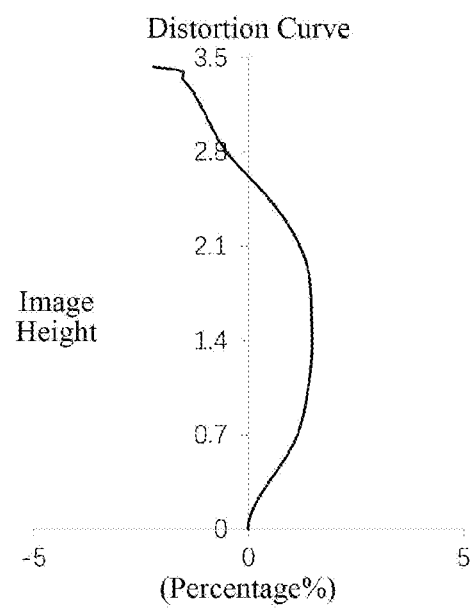
Figure 8D:
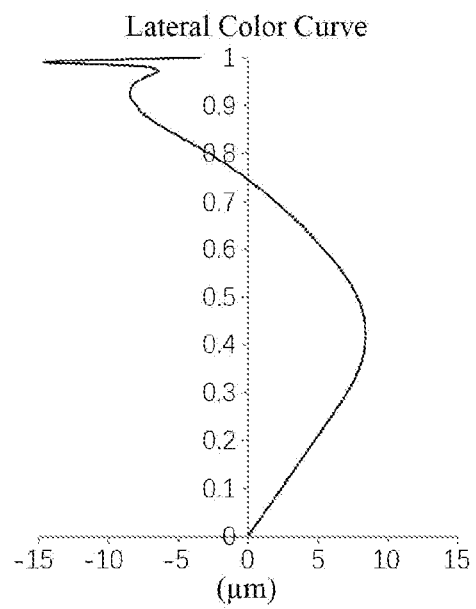

FIG. 8A illustrates a longitudinal aberration curve of the camera lens group in Embodiment 4, representing deviations of focal points of light of different wavelengths converged after passing through a lens assembly. FIG. 8B illustrates an astigmatic curve of the camera lens group in Embodiment 4, representing a curvature of a tangential image plane and a curvature of a sagittal image plane. FIG. 8C illustrates a distortion curve of the camera lens group in Embodiment 4, representing amounts of distortion corresponding to different image heights. FIG. 8D illustrates a lateral color curve of the camera lens group in Embodiment 4, representing deviations of different image heights on the image plane after light passes through the lens assembly. It can be seen from FIGS. 8A to 8D that the camera lens group given in Embodiment 4 can achieve a good imaging quality.

Embodiment 5

A camera lens group according to Embodiment 5 of the present disclosure is described below with reference to FIGS. 9 to 10D. FIG. 9 is a schematic structural diagram of the camera lens group according to Embodiment 5 of the present disclosure.

As shown in FIG. 9, the camera lens group includes, sequentially from an object side to an image side, a stop STO, a first lens E1, a second lens E2, a third lens E3, a fourth lens E4, a fifth lens E5, a sixth lens E6, an optical filter E7 and an image plane S15.

The first lens E1 has a positive refractive power, an object-side surface S1 of the first lens E1 is a convex surface, and an image-side surface S2 of the first lens E1 is a concave surface. The second lens E2 has a positive refractive power, an object-side surface S3 of the second lens E2 is a concave surface, and an image-side surface S4 of the second lens E2 is a convex surface. The third lens E3 has a negative refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a positive refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a convex surface, and an image-side surface S12 of the sixth lens E6 is a concave surface. The optical filter E7 has an object-side surface S13 and an image-side surface S14. Light from an object sequentially passes through the surfaces S1 to S14, and finally forms an image on the image plane S15.

In this embodiment, a total effective focal length f of the camera lens group is 3.22 mm, and a total track length TTL of the camera lens group is 4.10 mm, half of a diagonal length ImgH of an effective pixel area on the image plane S15 of the camera lens group is 3.43 mm, half of a maximal field-of-view Semi-FOV of the camera lens group is 46.3°, and an aperture value Fno of the camera lens group is 2.18.

Table 9 is a table showing basic parameters of the camera lens group in Embodiment 5. Here, the units of a radius of curvature, a thickness/distance and a focal length are millimeters (mm). Tables 10-1 and 10-2 show the high-order coefficients applicable to the aspheric surfaces in Embodiment 5. Here, the surface type of each aspheric surface may be defined using the formula (1) given in Embodiment 1.

TABLE 9

| | | | | material | | | |
|---|---|---|---|---|---|---|---|
| surface number | surface type | radius of curvature | Thickness/ distance | refractive index | abbe number | focal length | conic coefficient |
| OBJ | spherical | infinite | infinite | | | | |
| STO | spherical | infinite | −0.2425 | | | | |
| S1 | aspheric | 1.3237 | 0.3913 | 1.54 | 56.1 | 4.23 | 0.0422 |
| S2 | aspheric | 2.7791 | 0.1457 | | | | 6.1452 |
| S3 | aspheric | −23.5183 | 0.1806 | 1.67 | 19.2 | 23.56 | 90.0000 |
| S4 | aspheric | −9.5392 | 0.0190 | | | | 68.9614 |
| S5 | aspheric | 7.4405 | 0.2100 | 1.67 | 19.2 | −7.95 | −29.4948 |
| S6 | aspheric | 3.0892 | 0.1441 | | | | −46.8137 |
| S7 | aspheric | 60.0000 | 0.4505 | 1.54 | 56.1 | 5.72 | −90.0000 |
| S8 | aspheric | −3.2843 | 0.4663 | | | | −0.5536 |
| S9 | aspheric | −11.8409 | 0.3947 | 1.60 | 28.3 | 7.22 | 66.5101 |
| S10 | aspheric | −3.2393 | 0.3703 | | | | 1.1093 |
| S11 | aspheric | 1.4248 | 0.3460 | 1.53 | 55.7 | −3.20 | −12.7371 |

TABLE 9-continued

| surface number | surface type | radius of curvature | Thickness/ distance | refractive index | abbe number | focal length | conic coefficient |
|---|---|---|---|---|---|---|---|
| | | | | material | | | |
| S12 | aspheric | 0.7129 | 0.3651 | | | | −4.3854 |
| S13 | spherical | infinite | 0.2100 | 1.52 | 64.2 | | |
| S14 | spherical | infinite | 0.4065 | | | | |
| S15 | spherical | infinite | | | | | |

TABLE 10-1

| surface number | $A_4$ | $A_6$ | $A_8$ | $A_{10}$ | $A_{12}$ | $A_{14}$ | $A_{16}$ |
|---|---|---|---|---|---|---|---|
| S1 | −2.9794E−02 | 8.5018E−01 | −8.9034E+00 | 5.7097E+01 | −2.2532E+02 | 5.5470E+02 | −8.2730E+02 |
| S2 | −7.2763E−02 | −2.7176E−01 | 2.0714E+00 | −1.1008E+01 | 3.4017E+01 | −4.7735E+01 | −1.8806E+01 |
| S3 | −1.3870E−01 | 4.5404E−01 | −4.4241E+00 | 2.5308E+01 | −8.2207E+01 | 1.6739E+02 | −2.3273E+02 |
| S4 | −8.3001E−02 | 7.1655E−01 | −3.5765E+00 | −2.9652E+00 | 1.0466E+02 | −4.5842E+02 | 9.4974E+02 |
| S5 | −2.5066E−01 | 1.5819E+00 | −1.3271E+01 | 6.0669E+01 | −1.7693E+02 | 3.3146E+02 | −3.9235E+02 |
| S6 | −1.7581E−02 | 1.0910E−01 | −7.8359E−01 | 1.3225E−01 | 8.0986E+00 | −2.9486E+01 | 5.1989E+01 |
| S7 | −2.8382E−01 | 3.0056E+00 | −3.5286E+01 | 2.7735E+02 | −1.4611E+03 | 5.2742E+03 | −1.3209E+04 |
| S8 | −1.0976E−01 | −1.5175E+00 | 1.7333E+01 | −1.1576E+02 | 5.0170E+02 | −1.4737E+03 | 2.9892E+03 |
| S9 | −2.8158E−01 | 6.9332E−01 | −4.4843E+00 | 2.0673E+01 | −6.9566E+01 | 1.7194E+02 | −3.0983E+02 |
| S10 | −4.3085E−01 | 1.2287E+00 | −3.6158E+00 | 8.1927E+00 | −1.3593E+01 | 1.6963E+01 | −1.6163E+01 |
| S11 | −9.5828E−01 | 1.1880E+00 | −9.6461E−01 | 6.2068E−01 | −3.3738E−01 | 1.5351E−01 | −5.5715E−02 |
| S12 | −4.8285E−01 | 6.9627E−01 | −6.9948E−01 | 5.0948E−01 | −2.7222E−01 | 1.0732E−01 | −3.1345E−02 |

TABLE 10-2

| surface number | $A_{18}$ | $A_{20}$ | $A_{22}$ | $A_{24}$ | $A_{26}$ | $A_{28}$ | $A_{30}$ |
|---|---|---|---|---|---|---|---|
| S1 | 6.8323E+02 | −2.3922E+02 | 0.0000E+00 | 0.0000E+00 | 0.0000E+00 | 0.0000E+00 | 0.0000E+00 |
| S2 | 1.4202E+02 | −1.2526E+02 | 0.0000E+00 | 0.0000E+00 | 0.0000E+00 | 0.0000E+00 | 0.0000E+00 |
| S3 | 2.3233E+02 | −1.3067E+02 | 0.0000E+00 | 0.0000E+00 | 0.0000E+00 | 0.0000E+00 | 0.0000E+00 |
| S4 | −9.7131E+02 | 3.8963E+02 | 0.0000E+00 | 0.0000E+00 | 0.0000E+00 | 0.0000E+00 | 0.0000E+00 |
| S5 | 2.8487E+02 | −1.0418E+02 | 0.0000E+00 | 0.0000E+00 | 0.0000E+00 | 0.0000E+00 | 0.0000E+00 |
| S6 | −4.7262E+01 | 1.7499E+01 | 0.0000E+00 | 0.0000E+00 | 0.0000E+00 | 0.0000E+00 | 0.0000E+00 |
| S7 | 2.2897E+04 | −2.6925E+04 | 2.0479E+04 | −9.0829E+03 | 1.7831E+03 | 0.0000E+00 | 0.0000E+00 |
| S8 | −4.1895E+03 | 3.9822E+03 | −2.4489E+03 | 8.7854E+02 | −1.3953E+02 | 0.0000E+00 | 0.0000E+00 |
| S9 | 4.0402E+02 | −3.7722E+02 | 2.4737E+02 | −1.1001E+02 | 3.1125E+01 | −4.9340E+00 | 3.1854E−01 |
| S10 | 1.1849E+01 | −6.6843E+00 | 2.8608E+00 | −8.9707E−01 | 1.9318E−01 | −2.5328E−02 | 1.5133E−03 |
| S11 | 1.5424E−02 | −3 1594E−03 | 4.6667E−04 | −4.8081E−05 | 3.2674E−06 | −1.3121E−07 | 2.3505E−09 |
| S12 | 6.7833E−03 | −1.0814E−03 | 1.2513E−04 | −1.0205E−05 | 5.5542E−07 | −1.8075E−08 | 2.6552E−10 |

Figure 10C:
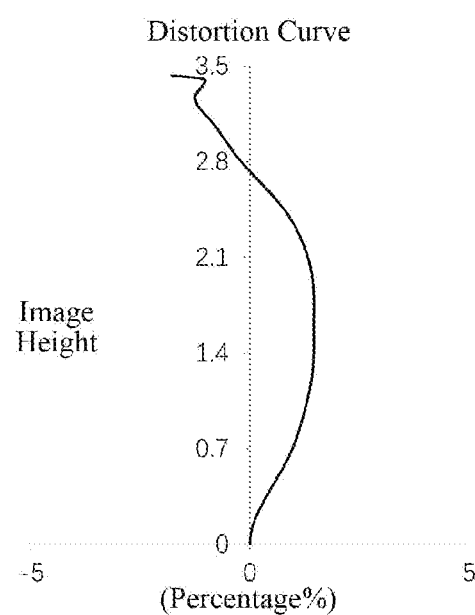
Figure 10D:
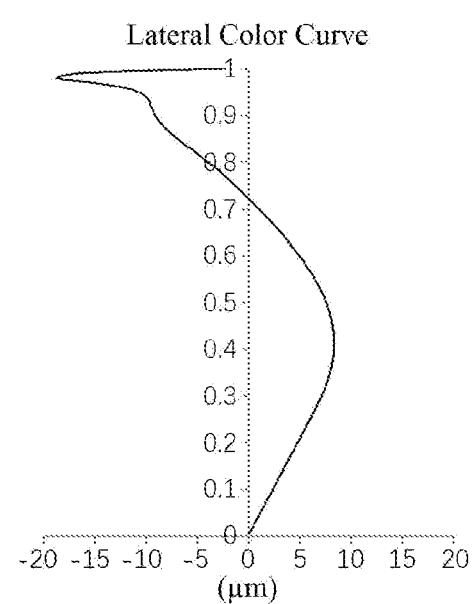

FIG. 10A illustrates a longitudinal aberration curve of the camera lens group in Embodiment 5, representing deviations of focal points of light of different wavelengths converged after passing through a lens assembly. FIG. 10B illustrates an astigmatic curve of the camera lens group in Embodiment 5, representing a curvature of a tangential image plane and a curvature of a sagittal image plane. FIG. 10C illustrates a distortion curve of the camera lens group in Embodiment 5, representing amounts of distortion corresponding to different image heights. FIG. 10D illustrates a lateral color curve of the camera lens group in Embodiment 5, representing deviations of different image heights on the image plane after light passes through the lens assembly. It can be seen from FIGS. 10A to 10D that the camera lens group given in Embodiment 5 can achieve a good imaging quality.

In summary, Embodiments 1 to 5 respectively satisfy the relationships shown in Table 11.

TABLE 11

| | embodiemnt | | | | |
|---|---|---|---|---|---|
| conditional expression | 1 | 2 | 3 | 4 | 5 |
| TTL/ImgH | 1.25 | 1.25 | 1.17 | 1.16 | 1.19 |
| f23/f6 | 3.24 | 4.64 | 4.14 | 4.39 | 3.79 |
| f4/BFL | 7.61 | 5.87 | 6.12 | 5.96 | 5.83 |
| R9/R10 | 4.37 | 3.64 | 3.75 | 5.03 | 3.66 |
| R5/R12 | 14.39 | 6.87 | 8.69 | 6.79 | 10.44 |
| CT1/T12 | 2.09 | 2.77 | 2.79 | 2.85 | 2.69 |
| (CT4 + CT6)/(CT4 − CT6) | 9.57 | 6.07 | 7.42 | 6.84 | 7.62 |
| (SAG61 + SAG62)/ (SAG61 − SAG62) | 2.43 | 3.10 | 6.43 | 4.19 | 4.65 |
| (ET5 + ET6)/(ET6 − ET5) | 3.43 | 7.57 | 8.65 | 6.96 | 6.32 |
| (DT61 + DT62)/(DT62 − DT61) | 13.08 | 18.12 | 17.97 | 19.75 | 17.58 |
| DT11 (mm) | 0.66 | 0.66 | 0.72 | 0.71 | 0.75 |

Embodiments of the present disclosure further provide an imaging apparatus having an electronic photosensitive element which may be a photosensitive charge-coupled device (CCD) or complementary metal-oxide semiconductor element (CMOS). The imaging apparatus may be an independent imaging device such as a digital camera, or may be an imaging module integrated in a mobile electronic device such as a mobile phone. The imaging apparatus is equipped with the camera lens group described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combination of the above technical features or equivalent features thereof without departing from the concept of the invention, for example, technical solutions formed by replacing the features as disclosed in the present disclosure with (but not limited to) technical features with similar functions.

What is claimed is:

1. A camera lens group, comprising, sequentially along an optical axis from an object side to an image side:
   a stop;
   a first lens having a positive refractive power, an object-side surface of the first lens is a convex surface, and an image-side surface of the first lens is a concave surface;
   a second lens having a refractive power, and an image-side surface of the second lens is a convex surface;
   a third lens having a negative refractive power, an object-side surface of the third lens is a convex surface, and an image-side surface of the third lens is a concave surface;
   a fourth lens having a positive refractive power, and an image-side surface of the fourth lens is a convex surface;
   a fifth lens having a positive refractive power, an object-side surface of the fifth lens is a concave surface, and an image-side surface of the fifth lens is a convex surface; and
   a sixth lens having a negative refractive power, an object-side surface of the sixth lens is a convex surface, and an image-side surface of the sixth lens is a concave surface,
   wherein, a distance TTL on the optical axis from the object-side surface of the first lens to an image plane of the camera lens group and half of a diagonal length ImgH of an effective pixel area on the image plane of the camera lens group satisfy: TTL/ImgH≤1.25; and
   at least one of the surfaces from the object-side surface of the first lens to the image-side surface of the sixth lens is an aspheric surface.

2. The camera lens group according to claim 1, wherein, a combined focal length f23 of the second lens and the third lens and an effective focal length f6 of the sixth lens satisfy: 3.00<f23/f6<5.00.

3. The camera lens group according to claim 1, wherein, an effective focal length f4 of the fourth lens and a distance BFL on the optical axis from the image-side surface of the sixth lens to the image plane of the camera lens group satisfy: 5.00<f4/BFL<8.00.

4. The camera lens group according to claim 1, wherein, a radius of curvature R9 of the object-side surface of the fifth lens and a radius of curvature R10 of the image-side surface of the fifth lens satisfy: 3.00<R9/R10<6.00.

5. The camera lens group according to claim 1, wherein, a radius of curvature R5 the object-side surface of the third lens and a radius of curvature R12 of the image-side surface of the sixth lens satisfy: 6.00<R5/R12<15.00.

6. The camera lens group according to claim 1, wherein, a center thickness CT1 of the first lens on the optical axis and a spacing distance T12 between the first lens and the second lens on the optical axis satisfy: 2.00<CT1/T12<3.00.

7. The camera lens group according to claim 1, wherein, a center thickness CT4 of the fourth lens on the optical axis and a center thickness CT6 of the sixth lens on the optical axis satisfy: 6.00<(CT4+CT6)/(CT4−CT6)<10.00.

8. The camera lens group according to claim 1, wherein, a distance SAG61 on the optical axis from an intersection point of the object-side surface of the sixth lens and the optical axis to a vertex of an effective radius of the object-side surface of the sixth lens, and a distance SAG62 on the optical axis from an intersection point of the image-side surface of the sixth lens and the optical axis to a vertex of an effective radius of the image-side surface of the sixth lens satisfy: 2.00<(SAG61+SAG62)/(SAG61−SAG62)<7.00.

9. The camera lens group according to claim 1, wherein, an edge thickness ET5 of the fifth lens and an edge thickness ET6 of the sixth lens satisfy: 3.00<(ET5+ET6)/(ET6−ET5)<9.00.

10. The camera lens group according to claim 1, wherein, a maximal effective radius DT61 of the object-side surface of the sixth lens and a maximal effective radius DT62 of the image-side surface of the sixth lens satisfy: 13.00<(DT61+DT62)/(DT62−DT61)<20.00.

11. The camera lens group according to claim 1, wherein, a maximal effective radius DT11 of the object-side surface of the first lens satisfies: DT11≤0.75 mm.

12. The camera lens group according to claim 1, wherein, a maximal field-of-view FOV of the camera lens group satisfies: FOV>89.0°.

13. A camera lens group, comprising, sequentially along an optical axis from an object side to an image side:
   a stop;
   a first lens having a positive refractive power, an object-side surface of the first lens is a convex surface, and an image-side surface of the first lens is a concave surface;
   a second lens having a refractive power, and an image-side surface of the second lens is a convex surface;
   a third lens having a negative refractive power, an object-side surface of the third lens is a convex surface, and an image-side surface of the third lens is a concave surface;
   a fourth lens having a positive refractive power, and an image-side surface of the fourth lens is a convex surface;
   a fifth lens having a positive refractive power, an object-side surface of the fifth lens is a concave surface, and an image-side surface of the fifth lens is a convex surface; and
   a sixth lens having a negative refractive power, an object-side surface of the sixth lens is a convex surface, and an image-side surface of the sixth lens is a concave surface,
   wherein, a center thickness CT1 of the first lens on the optical axis and a spacing distance T12 between the first lens and the second lens on the optical axis satisfy: 2.00<CT1/T12<3.00; and
   at least one of the surfaces from the object-side surface of the first lens to the image-side surface of the sixth lens is an aspheric surface.

14. The camera lens group according to claim 13, wherein, a combined focal length f23 of the second lens and the third lens and an effective focal length f6 of the sixth lens satisfy: 3.00<f23/f6<5.00.

15. The camera lens group according to claim 13, wherein, an effective focal length f4 of the fourth lens and a distance BFL on the optical axis from the image-side surface of the sixth lens to an image plane of the camera lens group satisfy: $5.00<f4/BFL<8.00$.

16. The camera lens group according to claim 13, wherein, a radius of curvature R9 of the object-side surface of the fifth lens and a radius of curvature R10 of the image-side surface of the fifth lens satisfy: $3.00<R9/R10<6.00$.

17. The camera lens group according to claim 13, wherein, a radius of curvature R5 the object-side surface of the third lens and a radius of curvature R12 of the image-side surface of the sixth lens satisfy: $6.00<R5/R12<15.00$.

18. The camera lens group according to claim 13, wherein, a center thickness CT4 of the fourth lens on the optical axis and a center thickness CT6 of the sixth lens on the optical axis satisfy: $6.00<(CT4+CT6)/(CT4-CT6)<10.00$.

19. The camera lens group according to claim 13, wherein, a distance SAG61 on the optical axis from an intersection point of the object-side surface of the sixth lens and the optical axis to a vertex of an effective radius of the object-side surface of the sixth lens, and a distance SAG62 on the optical axis from an intersection point of the image-side surface of the sixth lens and the optical axis to a vertex of an effective radius of the image-side surface of the sixth lens satisfy: $2.00<(SAG61+SAG62)/(SAG61-SAG62)<7.00$.

20. The camera lens group according to claim 13, wherein, an edge thickness ET5 of the fifth lens and an edge thickness ET6 of the sixth lens satisfy: $3.00<(ET5+ET6)/(ET6-ET5)<9.00$.

* * * * *